(12) United States Patent
Bryan et al.

(10) Patent No.: US 10,853,151 B2
(45) Date of Patent: *Dec. 1, 2020

(54) SYSTEM AND METHOD FOR SERVICE PROVISION IN A MULTI-TENANT ENVIRONMENT

(71) Applicant: OneSource Virtual, Inc., Irving, TX (US)

(72) Inventors: Wesley Bryan, McKinney, TX (US); Scott Ingulli, Tampa, FL (US)

(73) Assignee: OneSource Virtual, Inc., Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/974,580

(22) Filed: May 8, 2018

(65) Prior Publication Data

US 2019/0056979 A1    Feb. 21, 2019

Related U.S. Application Data

(63) Continuation of application No. 14/081,002, filed on Nov. 15, 2013, now Pat. No. 9,965,339.

(60) Provisional application No. 61/792,553, filed on Mar. 15, 2013.

(51) Int. Cl.
*G06F 9/54* (2006.01)
*G06Q 10/06* (2012.01)
*G06Q 40/02* (2012.01)

(52) U.S. Cl.
CPC ............. *G06F 9/542* (2013.01); *G06Q 10/06* (2013.01); *G06Q 40/02* (2013.01)

(58) Field of Classification Search
CPC ......... G06F 9/542; G06Q 10/06; G06Q 40/02
USPC ................................... 709/224; 707/790–831
See application file for complete search history.

(56) References Cited

U.S. PATENT DOCUMENTS

| | | | |
|---|---|---|---|
| 7,730,169 B1 | 6/2010 | Greschler et al. | |
| 7,930,318 B2 * | 4/2011 | Becker | G06F 16/958 707/795 |
| 8,239,233 B1 | 8/2012 | Albrecht | |
| 8,452,726 B2 * | 5/2013 | Kuruganti | H04L 67/06 707/608 |
| 2002/0147757 A1 * | 10/2002 | Day | H04L 67/34 718/1 |
| 2003/0033209 A1 | 2/2003 | Minear et al. | |
| 2005/0015620 A1 | 1/2005 | Edison et al. | |
| 2006/0161441 A1 | 7/2006 | Nathoo et al. | |

(Continued)

*Primary Examiner* — Zi Ye
(74) *Attorney, Agent, or Firm* — Norton Rose Fulbright US LLP

(57) ABSTRACT

Provided is a service provision in a multi-tenant environment which includes determining, by an outsourcing service augmentation platform, that an event has occurred within a tenant instance. Authorization credentials needed to access the tenant instance are provided to the platform. Further steps can include identifying a type of the event and processing the event. The processing includes determining that data corresponding to the event is needed from the tenant instance, requesting the data from an application programming interface (API) corresponding to the tenant instance, receiving the data from the tenant instance, and executing actions within the platform based on the data, the type of event, and a configuration of services defined for the tenant instance.

38 Claims, 29 Drawing Sheets

(56) References Cited

U.S. PATENT DOCUMENTS

| | | | |
|---|---|---|---|
| 2009/0012884 A1* | 1/2009 | Harman | G06Q 10/10 |
| | | | 705/31 |
| 2009/0327311 A1 | 12/2009 | Becker | |
| 2010/0121923 A1* | 5/2010 | Cvetkovic | G06Q 10/06 |
| | | | 709/206 |
| 2011/0208711 A1 | 8/2011 | Van Vleet et al. | |
| 2011/0302133 A1 | 12/2011 | Kuruganti et al. | |
| 2012/0109947 A1* | 5/2012 | Yu | H04L 63/102 |
| | | | 707/725 |
| 2012/0158821 A1 | 6/2012 | Barros | |
| 2014/0280948 A1* | 9/2014 | Schmidt | H04L 47/827 |
| | | | 709/226 |

* cited by examiner

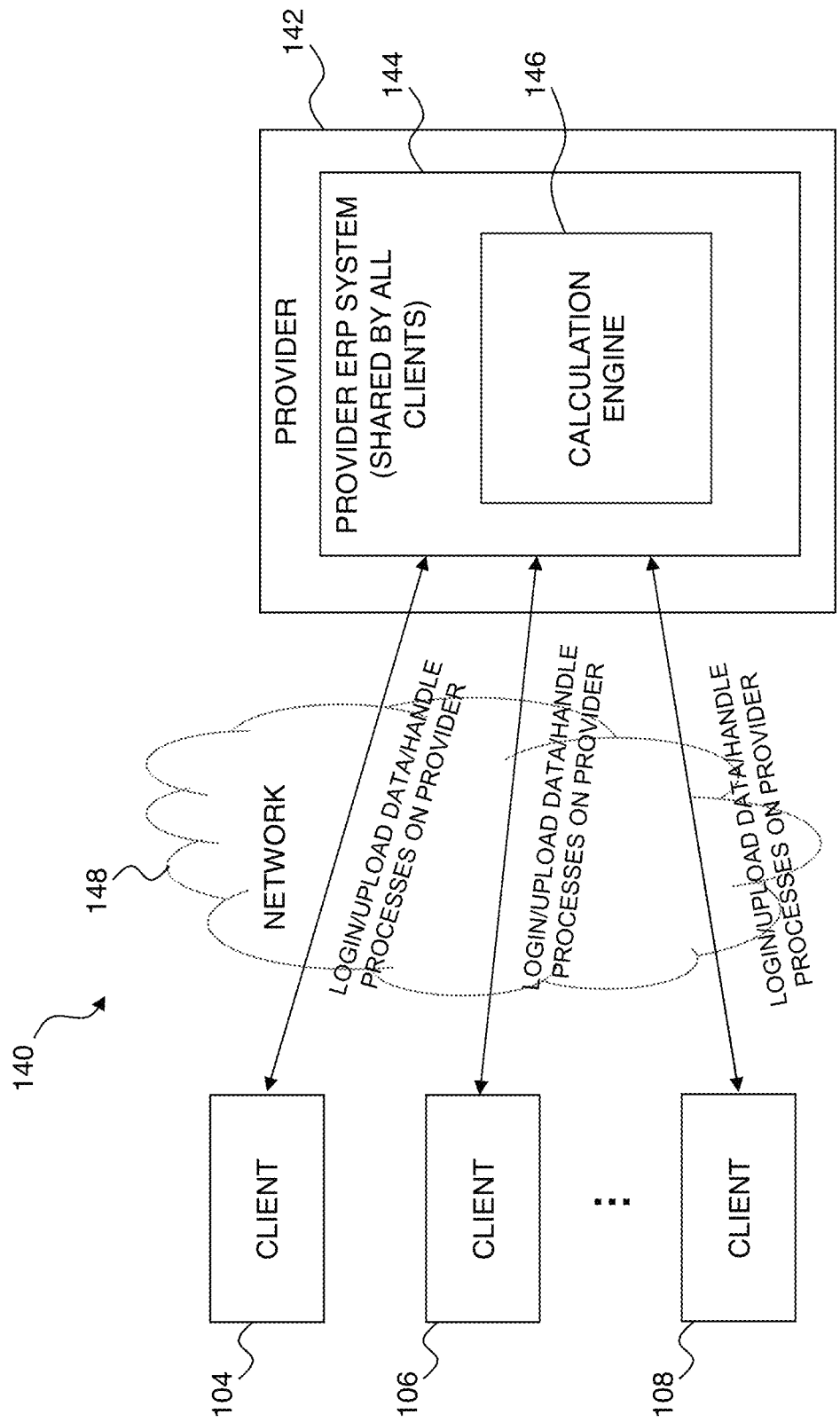

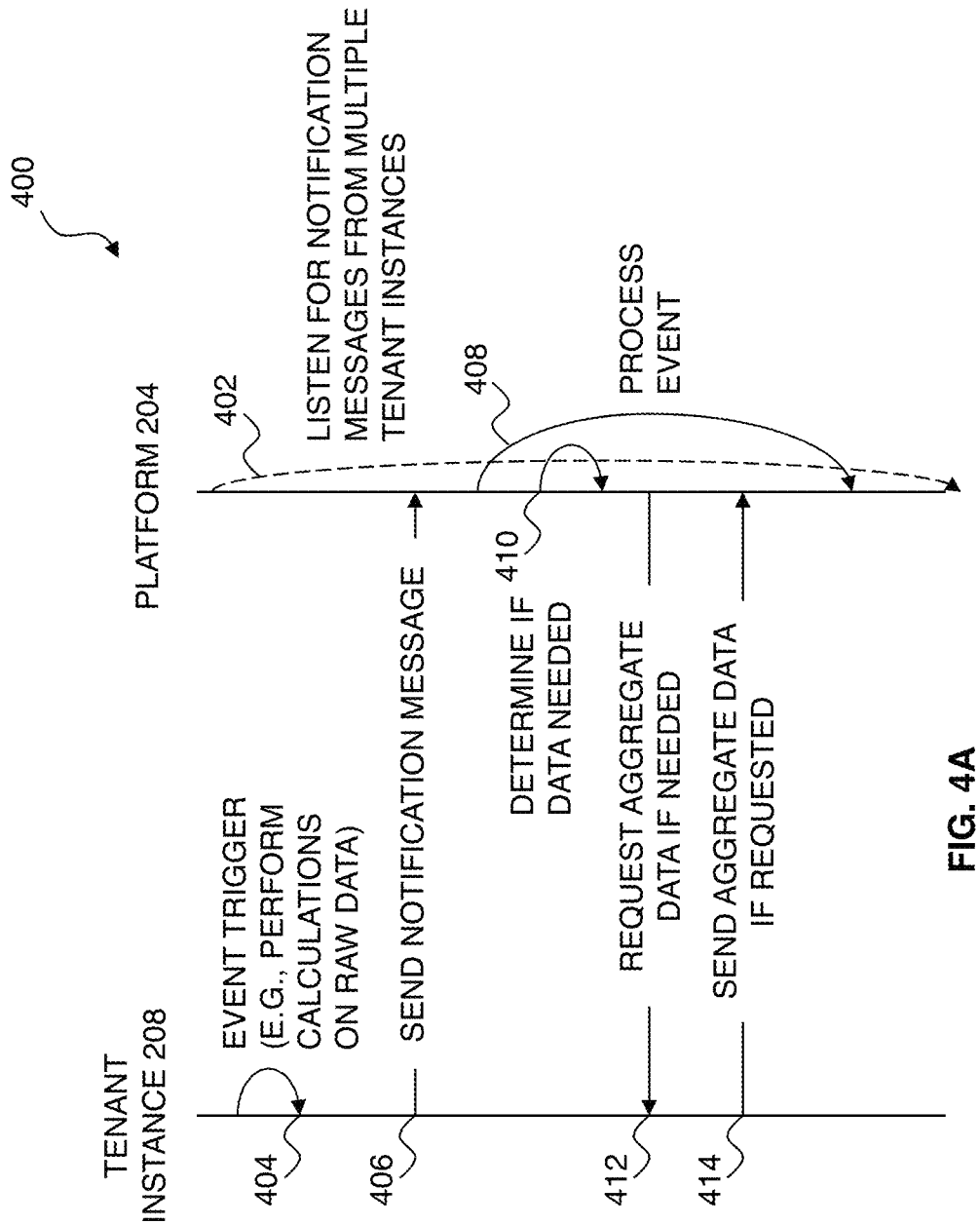

| Payroll Services | Provider | Client |
|---|---|---|
| Time System | | |
| Finalizing Time | | X |
| Importing Time | | X |
| Balancing the Time | | X |
| Troubleshooting Issues to Time System | X (WebTime) | X (Other Time System) |
| Workday On-Cycle Payroll | | |
| Initiating the pay cycle event | | X |
| Calculating the payroll | | X |
| Recalculating after changes | | X |
| Approving payroll | | X |
| Completing Payroll | | X |
| Settling the Payroll | X | |
| Printing On-Cycle Checks | X | |
| Funding of Payroll | | X |
| Workday Off-Cycle Checks – Same day due by Noon CST | | |
| Entering off-cycle check information | | X |
| Completing off-cycle check information | | X |
| Settling off-cycle check information (Provider Account) | X | |
| Printing off-cycle checks (Provider Account) | X | |
| Workday Manual Checks | | |
| Send the data for the transaction(payment, gift card) to Provider | | X |
| Enter manual check information | | X |
| Integrations | | |
| Running periodic tax integration if using Provider's tax filing services | | X |
| Running quarterly tax integration if using Provider's tax filing services | | X |
| Running year-end tax integration if using Provider's tax filing services | | X |
| ACH integration | X | |
| Troubleshooting payroll integrations | | X |
| Payroll Administrative Tasks | | |
| Setting up new earnings codes | | X |
| Setting up new deduction codes | | X |
| Provide Payroll GL Accounting and Posting Rules | | X |
| Maintain GL Account Setup and Posting Rules Setup | | X |
| Close Out GL Ledger Years | | X |

FIG. 11C

| | | |
|---|---|---|
| Troubleshooting current codes | | X |
| Managing the pay cycle business process | | X |
| Creating payroll custom reports | | X |
| Compensation Administrative Tasks | | |
| Managing all one-time payment plans | | X |
| Managing compensation plans | | X |
| Absence Plans Administrative Tasks (In Workday) | | |
| Managing absence plans | | X |
| Managing troubleshooting plans | | X |
| Employee Maintenance | | |
| Entering deductions into Maintain Input | | X |
| Entering earnings into Maintain Input | | X |
| Managing employee compensation | | X |
| Managing all one-time payments | | X |
| Managing compensation | | X |
| Provider Payroll Admin Setup and Maintenance | | |
| Maintaining hire and termination status in Workday for Provider's contingent workers | X | |
| Managing the Provider supervisory organization in Workday | X | |
| Managing the business processes for Provider's contingent workers in Workday | X | |
| Managing external IDs for Integrations | X | |
| End of the Year Processing | | |
| Prior year adjustments | | X |
| W-2 creation if using Provider's W-2 printing services | X | |
| W-2c creation if using Provider's W-2 printing services | X | |
| Workday Updates | | |
| Payroll end-to-end testing | | X |
| Payroll unit testing | | X |
| Benefit testing (that affects payroll) | | X |
| Absence testing (that affects payroll) | | X |
| Integrations testing | | X |
| Escheatment | | |
| Research and management of checks that have not been cashed | X | |
| Return funds to client | X | |
| Notification to employees or ex-employees according to state requirements | | X |
| Remittances of funds to the state according to state requirements | | X |

FIG. 11C
CONTINUED

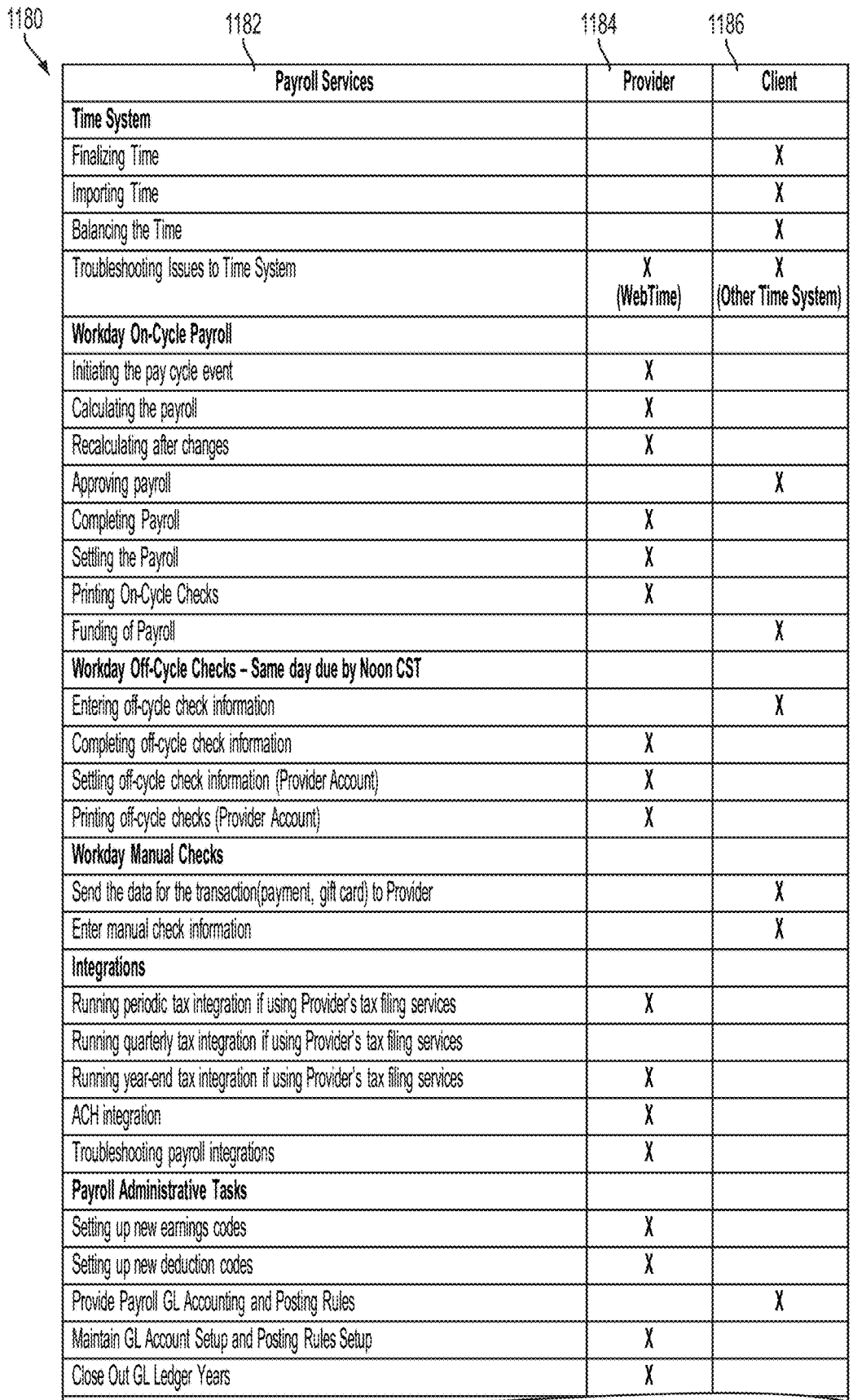

| Payroll Services | Provider | Client |
|---|---|---|
| Time System | | |
| Finalizing Time | | X |
| Importing Time | | X |
| Balancing the Time | | X |
| Troubleshooting Issues to Time System | X (WebTime) | X (Other Time System) |
| Workday On-Cycle Payroll | | |
| Initiating the pay cycle event | X | |
| Calculating the payroll | X | |
| Recalculating after changes | X | |
| Approving payroll | | X |
| Completing Payroll | X | |
| Settling the Payroll | X | |
| Printing On-Cycle Checks | X | |
| Funding of Payroll | | X |
| Workday Off-Cycle Checks - Same day due by Noon CST | | |
| Entering off-cycle check information | | X |
| Completing off-cycle check information | X | |
| Settling off-cycle check information (Provider Account) | X | |
| Printing off-cycle checks (Provider Account) | X | |
| Workday Manual Checks | | |
| Send the data for the transaction(payment, gift card) to Provider | | X |
| Enter manual check information | | X |
| Integrations | | |
| Running periodic tax integration if using Provider's tax filing services | X | |
| Running quarterly tax integration if using Provider's tax filing services | | |
| Running year-end tax integration if using Provider's tax filing services | X | |
| ACH integration | X | |
| Troubleshooting payroll integrations | X | |
| Payroll Administrative Tasks | | |
| Setting up new earnings codes | X | |
| Setting up new deduction codes | X | |
| Provide Payroll GL Accounting and Posting Rules | | X |
| Maintain GL Account Setup and Posting Rules Setup | X | |
| Close Out GL Ledger Years | X | |

FIG. 11D

| | | |
|---|---|---|
| Troubleshooting current codes | X | |
| Managing the pay cycle business process | X | |
| Creating payroll custom reports | | X |
| Compensation Administrative Tasks | | |
| Managing all one-time payment plans | | X |
| Managing compensation plans | | X |
| Absence Plans Administrative Tasks (In Workday) | | |
| Managing absence plans | | X |
| Managing troubleshooting plans | | X |
| Employee Maintenance | | |
| Entering deductions into Maintain Input | | X |
| Entering earnings into Maintain Input | | X |
| Managing employee compensation | | X |
| Managing all one-time payments | | X |
| Managing compensation | | X |
| Provider Payroll Admin Setup and Maintenance | | |
| Maintaining hire and termination status in Workday for Provider's contingent workers | X | |
| Managing the Provider supervisory organization in Workday | X | |
| Managing the business processes for Provider's contingent workers in Workday | X | |
| End of the Year Processing | | |
| Prior year adjustments | | X |
| W-2 creation if using Provider's W-2 printing services | X | |
| W-2c creation if using Provider's W-2 printing services | X | |
| Workday Updates | | |
| Payroll end-to-end testing | X | |
| Payroll unit testing (including Provider Services Integrations) | X | |
| Benefit testing (that affects payroll) | X | |
| Absence testing | | X |
| Integrations testing | | X |

FIG. 11D
CONTINUED

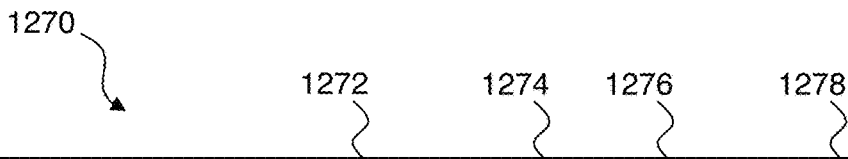

| Payroll Tax Services | PROVIDER | CLIENT | Notes |
|---|---|---|---|
| Running Periodic Tax | Notes | X | Provider will run if client elects Payroll Administration Services. |
| Running quarterly tax integration | Notes | X | Provider will run if client elects Payroll Administration Services. |
| Running year-end tax integration | Notes | X | Provider will run if client elects Payroll Administration Services. |
| Accurate and timely payment of taxes | X | | |
| Accurate and timely filing of returns | X | | |
| Timely responses to any agency or inquiries regarding payroll tax payments or filings. | X | | Response to agency within 5 business days of receipt. Customer response defined by Service Level Agreement. |
| Assistance with registering for new jurisdictions and closing old jurisdiction accounts. | X | | 30 days prior to needed change |
| Accurate and timely filing of W-2's and W-2c's | X | | |
| Providing accurate and complete company federal, state and local tax ID numbers, rates, filing frequencies and filing methods during implementation data gathering. | | X | |
| Timely communication of need for new tax jurisdictions | | X | 30 Days |
| Timely communication of need to close jurisdictions and accounts. | | X | 30 Days |
| Providing accurate and complete employee tax history for implementation. | | X | |
| Forwarding any changes to federal, state and local tax ID numbers, rates, filing frequencies and filing methods if received after go-live. | | X | Within 24 hours of customer receipt by electronic means. |
| Providing copies of any tax notices received from agencies | | X | Within 24 hours of customer receipt by electronic means. |
| Maintaining accurate employee federal, state and local tax records in the Workday system. | | X | |
| Off-cycle payroll - immediate communication and funding enabling taxes to be paid the next day in accordance with federal and state regulations. | | X | If combined total tax liability is over $100,000, then taxes must be *paid* and received by the taxing authorities the next business day. |
| Maintaining accurate tax rates within the Workday system | X | | |
| Monthly, quarterly and annual tax reconciliations between the Workday system and amounts reported on Provider -prepared payroll tax returns | X | | Interim |

SYSTEM AND METHOD FOR SERVICE PROVISION IN A MULTI-TENANT ENVIRONMENT

CROSS-REFERENCE TO RELATED APPLICATIONS

The present patent application is a continuation of patent application Ser. No. 14/081,002, filed Nov. 15, 2013, entitled SYSTEM AND METHOD FOR SERVICE PROVISION IN A MULTI-TENANT ENVIRONMENT, now issued U.S. Pat. No. 9,965,339 on May 8, 2018, which is related to provisional patent application No. 61/792,553, filed Mar. 15, 2013, entitled SYSTEM AND METHOD FOR SERVICE PROVISION IN A MULTI-TENANT ENVIRONMENT, the entire contents are incorporated by reference herein.

TECHNICAL FIELD

This application is directed to systems and methods for interacting with third-party software to provide services in a cloud-based multi-tenant environment.

BACKGROUND

In traditional outsourcing models that involve the provision of services by a provider to a client, the provider typically interacts with an on premise client system, the client uses a remote system provided by the provider, or a hybrid model is used with both an on premise client system and a remote provider system. All of these combinations have disadvantages. Accordingly, improved systems and methods are needed.

BRIEF DESCRIPTION OF THE DRAWINGS

For a more complete understanding, reference is now made to the following description taken in conjunction with the accompanying Drawings in which:

FIGS. 1A-1C illustrate three embodiments of enterprise resource planning (ERP) environments;

FIGS. 4A and 4B illustrate sequence diagrams representing embodiments of information flows that may occur within the system of FIG. 2;

FIGS. 11C and 11D illustrate embodiments of models that may be used to apportion payroll service responsibilities within the environment of FIG. 2;

FIG. 12C illustrates one embodiment of a model that may be used to apportion tax service responsibilities within the environment of FIG. 2;

FIGS. 14-17 illustrate embodiments of screen displays that may be provided to users within the environment of FIG. 2.

DETAILED DESCRIPTION

Figure 1A:
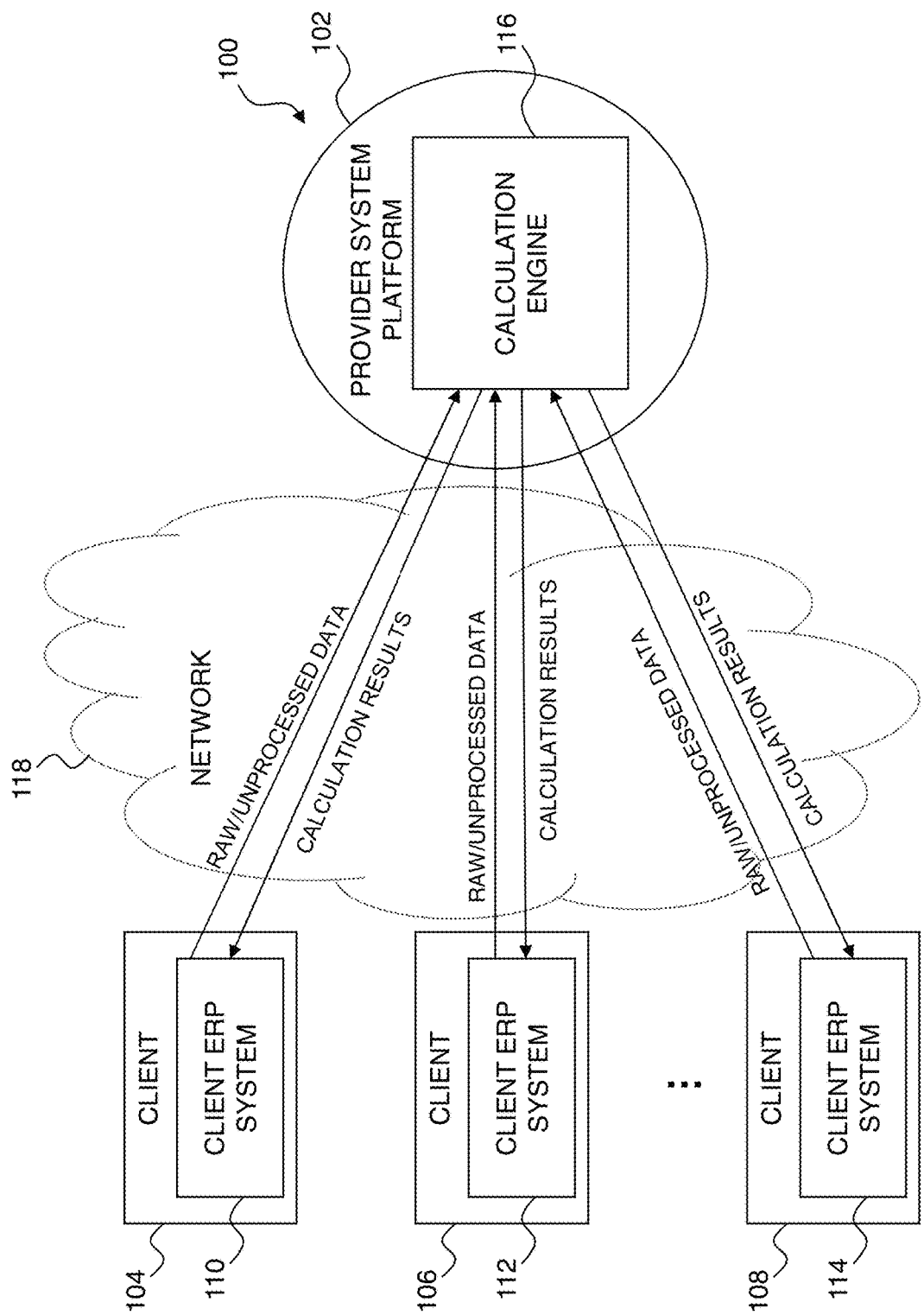

Referring now to the drawings, wherein like reference numbers are used herein to designate like elements throughout, the various views and embodiments of a system and method for service provision in a multi-tenant environment are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

Reliance on enterprise resource planning (ERP) systems has grown steadily as businesses become more knowledgeable about leveraging computing resources to become more efficient. ERP systems meet business needs by providing various services, with the list of services varying depending on the capabilities of the ERP system being used and the needs of the particular business using the system. For example, an ERP system may provide services for financial accounting, management accounting, human resource management, manufacturing, supply chain management, project management, and/or customer relationship management.

Financial accounting services may include services directed to areas such as general ledger, fixed asset, payables, receivables, cash management, and/or financial consolidation. Management accounting services may include services directed to areas such as budgeting, costing, cost management, and/or activity based costing. Human resource management (HRM) (which may be part of or include human capital management (HCM)) may include services directed to areas such as recruiting, training, payroll, benefits, 401K, diversity management, retirement, and/or separation. Manufacturing services may include services directed to areas such as engineering, bill of materials, work orders, scheduling, capacity, workflow management, quality control, manufacturing process, manufacturing projects, manufacturing flow, and/or product life cycle management.

Supply chain management services may include services directed to areas such as supply chain planning, supplier scheduling, order to cash, purchasing, inventory, product configurator, and/or claim processing. Project management services may include services directed to areas such as project planning, resource planning, project costing, work break down structure, billing, time and expense, performance units, and/or activity management. Customer relationship management (CRM) services may include services directed to areas such as sales and marketing, commissions, service, customer contact, and/or call center support. ERP systems may also cover other services needed to implement such systems, such as data services and access control management (ACM) services that handle user privileges for various processes.

Figure 1B:
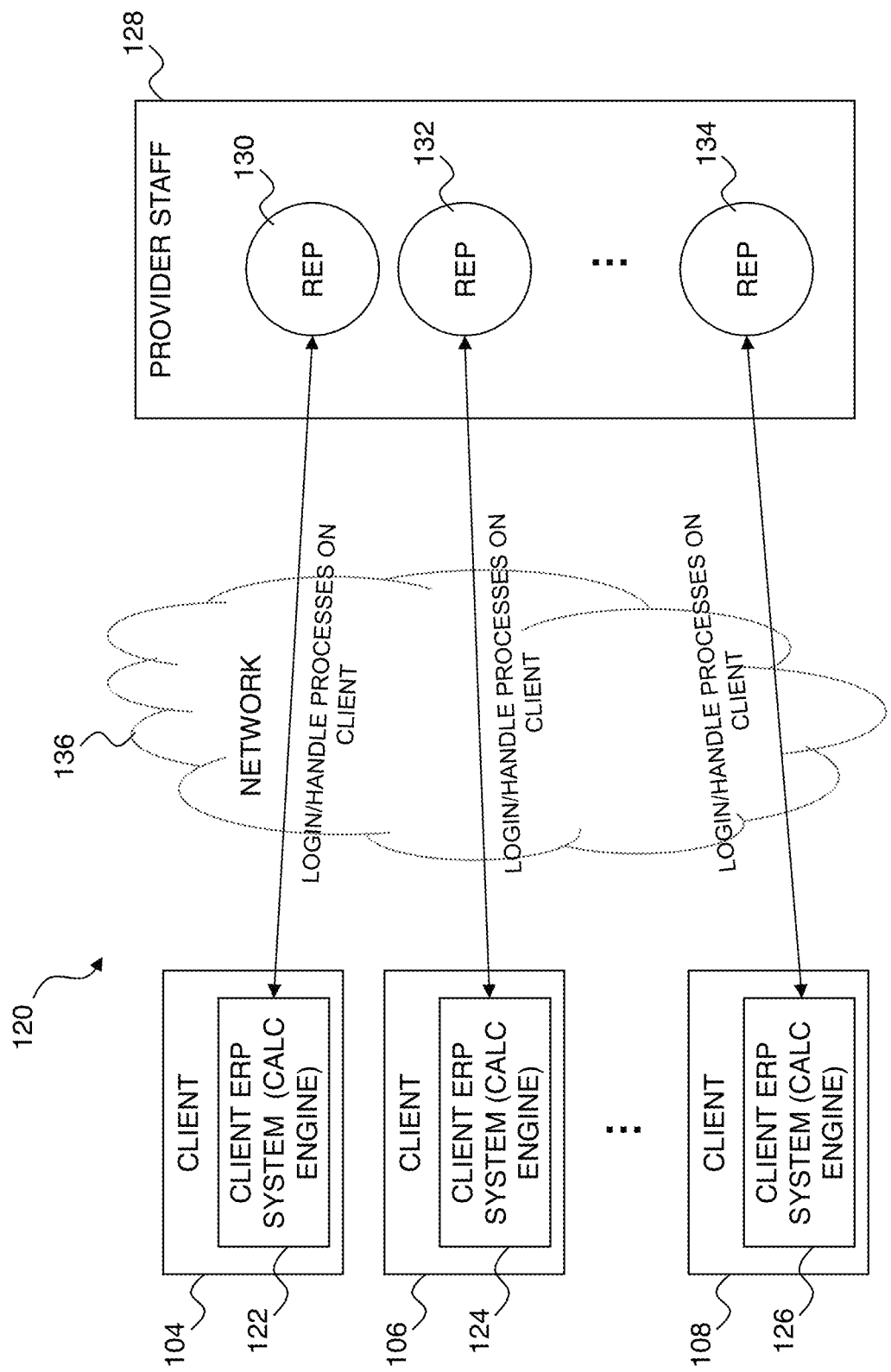

Referring to FIGS. 1A-1C, three embodiments of traditional ERP environments illustrate different ways in which a provider (e.g., a business process outsourcing (BPO) provider) may interact with one or more clients. FIG. 1A illustrates an ERP on premise solution with integration to a provider. FIG. 1B illustrates an ERP on premise solution with staff augmentation. FIG. 1C illustrates a shared ERP cloud environment. It is understood that FIGS. 1A-1C represent three of many possible ERP environments and that other environments may combine various aspects of FIGS. 1A-1C.

Referring specifically to FIG. 1A, an environment 100 illustrates an ERP on premise solution with a provider system platform 102 providing support for clients 104, 106, and 108. Each client 104, 106, and 108 has an on premise ERP system, with the client 104 having a client ERP system 110, the client 106 having a client ERP system 112, and the client 108 having a client ERP system 114. The client ERP systems 110, 112, and 114 send raw and/or otherwise unprocessed data (e.g., as flat files or using other suitable formats) to the provider system platform 102 for processing.

It is understood that the client ERP systems 110, 112, and 114 may be identical, may be similar but customized, or may be totally different. In embodiments where differences exist and the differences impact the services provided by the provider system platform 102, the client ERP systems 110, 112, and 114 and/or the provider system platform 102 may be configured (e.g., customized) to account for the differences.

In the present example, the provider system platform 102 includes a calculation engine 116. The calculation engine 116 receives the raw/unprocessed data and performs calculations and/or other processing. The provider system platform 102 then returns the results to the client ERP system 110, 112, or 114 from which it received the corresponding raw/unprocessed data. For example, the calculation engine 116 may receive raw payroll information (e.g., employee identifier, hours worked, rate per hour, withholding, garnishments, and similar information needed to calculate the amount due for each employee) from the client ERP system 110, calculate payroll, and return the payroll calculations to the client ERP system 110. Communications between the provider system platform 102 and the clients 104, 106, and 108 may occur through one or more networks 118, which may be any type of wireline and/or wireless network or networks suitable for such communications.

Accordingly, in this example, the provider system platform 102 provides calculation functionality for the client ERP systems 110, 112, and 114. This benefits the clients 104, 106, and 108, as the client ERP systems 110, 112, and 114 may not include calculation functionality themselves, may lack adequate processing capabilities to handle the calculations even if they include such functionality, and/or may benefit from using the provider system platform 102 for other reasons. However, the clients 104, 106, and 108 have to transfer large amounts of data to the provider system platform 102, which exposes the data outside of the clients 104, 106, and 108 at least at some level. Calculation/processing functionality is out of the clients' control and the clients generally have no access to or control over the black box of the calculation engine 116 to which their data is sent. Moreover, the clients 104, 106, and 108 may be responsible for maintaining their respective client ERP systems 110, 112, and 114.

Referring specifically to FIG. 1B, an environment 120 illustrates an ERP on premise solution with staff augmentation provided by provider staff 128. Each client 104, 106, and 108 has an on premise ERP system that includes a calculation engine, with the client 104 having a client ERP system 122, the client 106 having a client ERP system 124, and the client 108 having a client ERP system 126. The client ERP systems 122, 124, and 126 perform their own calculations and/or other processing. It is understood that the client ERP systems 122, 124, and 126 may be identical, may be similar but customized, or may be totally different.

Representatives 130, 132, and 134 may access the client ERP systems 122, 124, and 126 and perform tasks within the client ERP systems 122, 124, and 126. For example, the representative 130 may log into the client ERP system 122 and perform payroll processing using the calculation engine provided by the client ERP system 122. Accordingly, in this example, the client ERP systems 122, 124, and 126 may be fully functional, but staff may be provided from an outside source to use the client ERP systems 122, 124, and 126. In some embodiments, the provider staff 128 may be provided by a company that also provides the client ERP systems 122, 124, and 126, while in other embodiments the provider staff 128 may be separate from the provider of the client ERP systems 122, 124, and 126. Communications between the provider staff 128 and the clients 104, 106, and 108 may occur through one or more networks 136, which may be any type of wireline and/or wireless network or networks suitable for such communications. In some embodiments, one or more of the representatives 130, 132, and 134 may work on site at a client location.

This example provides benefits over the environment of FIG. 1A, such as not having to transfer large amounts of data to the provider. However, the clients' raw data is still exposed to the representative staff 128 as the representatives 130, 132, and 134 are able to log into the client ERP systems 122, 124, and 126 and access the data. Moreover, the clients 104, 106, and 108 may be responsible for maintaining their respective client ERP systems 122, 124, and 126.

Referring specifically to FIG. 1C, an environment 140 illustrates a shared cloud solution with a provider 142 supporting clients 104, 106, and 108. The clients 104, 106, and 108 do not have on premise ERP systems and are reliant on the provider 142. The provider 142 supports the clients 104, 106, and 108 using a provider ERP system 144 that includes a calculation engine 146. The clients 104, 106, and 108 share the provider ERP system 144 and their information may be partitioned on the system.

In the present example, the clients 104, 106, and 108 log into the provider ERP system 144 (e.g., using a browser or another client). For example, the client 104 may log into the client ERP system 144 and perform payroll processing using the calculation engine 146. This process entails the client 104 uploading information to the provider ERP system 144 and/or entering data directly into the system. Communications between the provider ERP system 144 and the clients 104, 106, and 108 may occur through one or more networks 148, which may be any type of wireline and/or wireless network or networks suitable for such communications.

This example provides benefits over the environments of FIGS. 1A and 1B, such as not having to maintain a client ERP system. However, the clients 104, 106, and 108 are logging into a shared system and all of their data may be exposed to the provider 142. Moreover, it may be difficult to move to another provider because the clients 104, 106, and 108 do not control their data, which is stored on the provider ERP system 144.

As illustrated in the embodiments of FIGS. 1A-1C, traditional ERP systems provide the previously described ERP services to each business client in various ways, none of which are ideal. Although each traditional system may not have the same disadvantages, various disadvantages do exist. For example, if the ERP system is an integrated solution, the client's options are generally limited first by the ERP choices available from that particular provider and then are further limited by the integration of those services into the client's business model. Such traditional models present difficulties for both the provider and the client. From the client's perspective, limitations of the traditional ERP outsourcing model include limited software options, dependence on the provider, lack of transparency, and/or delayed processing when an error occurs. From the provider's perspective, limitations of the traditional ERP outsourcing model include a lack of scalability and the possible exposure of sensitive client information if the provider's system is breached due to the raw client information provided by the client in some models.

In some traditional ERP systems, the client is generally limited in their software selection to the software that is available from the provider, even if other software might be better for the client's needs. This limitation also increases the client's dependence on the provider once the software is integrated into the client's business. Typically, the provider will assess the client's needs that are to be outsourced (e.g., services such as payroll and taxes). The provider then requires that the client use a software package that is often proprietary and is designed for use with the provider's system. This software package may be customized to meet the client's specific needs. The level of customization may be high, which increases not only the complexity of any software updates and bug fixes, but also makes it difficult for anyone except the provider's representatives to work with the software.

The effort of implementing an ERP system and the often proprietary nature of such systems makes it difficult for the client to leave the provider even if better solutions become available. Accordingly, the client may remain with the provider simply because the effort and expense of moving to another provider is greater than the possible advantages offered by other software packages.

In terms of transparency, the client may have no insight into who is being allowed to access their information on the provider's side and may have no real control over how that information is handled in some traditional ERP systems. Nor may the client have any access to the final calculated data, which means that the client cannot access their own information at will. When incorrect data is sent for processing or when a processing error occurs, the entire process may need to be repeated starting with resending the data to the provider. As the client is sending raw data, there may be no way to know if there is a problem until notified by the provider. This is inefficient and may cause delays in payroll and other outsourced services, in addition to requiring additional time and effort on the client's part to correct the error.

From the provider's perspective in systems that are integrated, scalability may not be practical because of the integration of the ERP system with each client and the need for one or more representatives to be assigned to handle a particular client due to the often unique software customization performed for a client. For example, it would likely be difficult for a representative to interact with a client to whom the representative is not assigned as the representative will likely not be familiar with the ERP system due to the customized manner in which the ERP system may have been set up. Accordingly, any representatives assigned to a particular client must be familiar with the particular customizations performed for that client. This means that the loss of an experienced representative requires that a new representative be trained or otherwise brought up to speed on the client's particular software, taking both the provider's time and possibility impacting the level of service provided to the client during the training period. Furthermore, a single client may have multiple customized integrations and upgrading or addressing a problem may require modifying the code for each integration across multiple clients, which can be an expensive and time consuming task.

The way in which the ERP systems may be integrated with the clients and the way each client uploads large amounts of data for processing makes it difficult for a provider to gauge its performance across all clients. For example, if the provider receives and processes the raw information for each client separately based on that client's particular ERP system, the provider typically has no way of tracking individual matters for a particular client, much less across all clients. While it might be possible to perform some relatively simple comparisons, this would generally require that the provider store all the data, run various analysis processes for each client's data, and then compare the results. Even this process would not enable the provider to actually make comparisons across all clients, such as whether checks are being issued in a timely manner or how many items have been held for a particular reason. The lack of such analytical capability makes it difficult for the provider to determine areas where performance is lacking and additional resources are needed.

Figure 2:
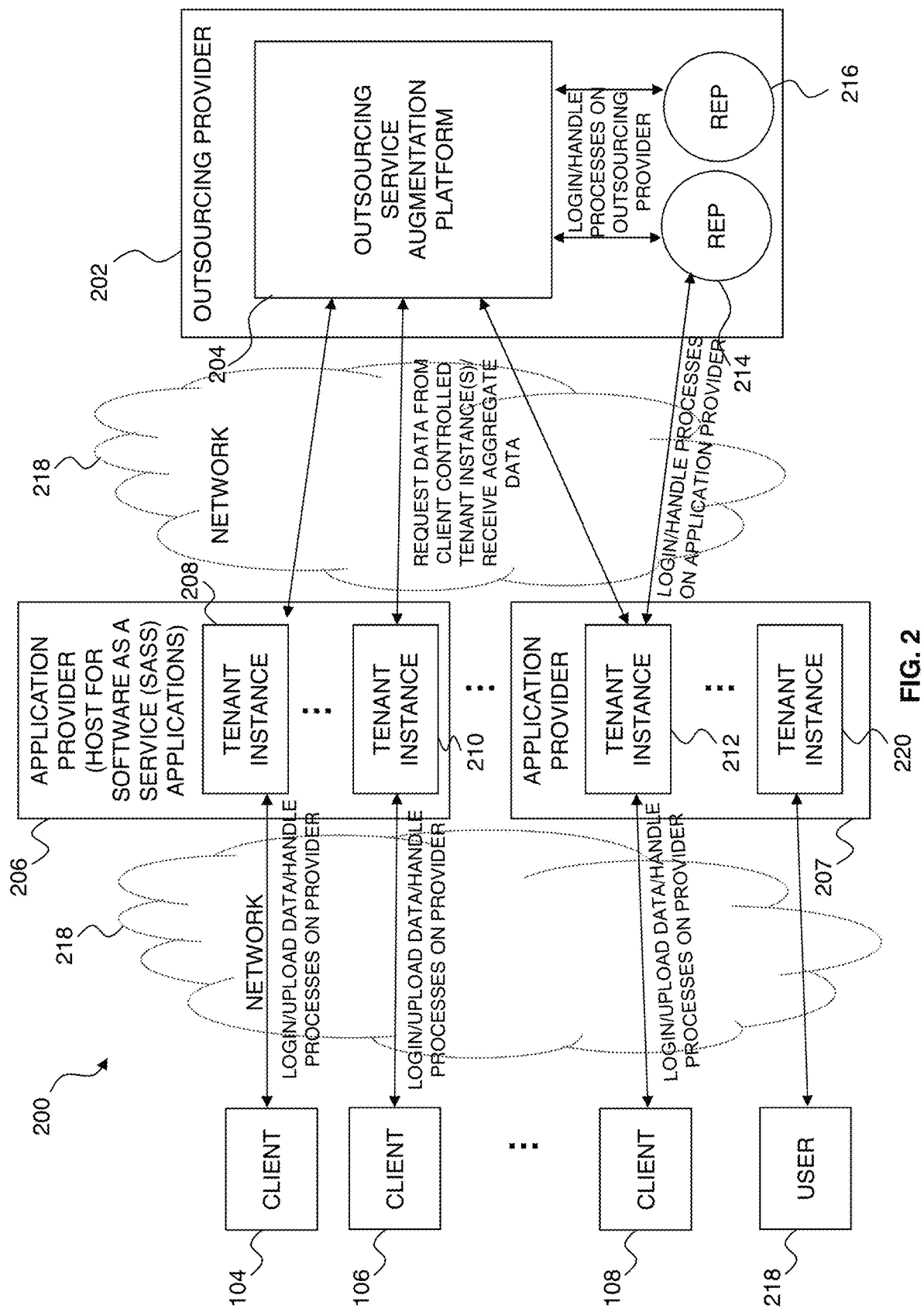
FIG. 2 illustrates one embodiment of an ERP environment according to the present disclosure.

Referring to FIG. 2, one embodiment of an environment 200 is provided that may be used to address various disadvantages present in the embodiments of FIGS. 1A-1C. An outsourcing provider 202 provides an outsourcing service augmentation platform 204 that is configured to interact with software on application providers 206 and 207. While in some embodiments the outsourcing provider 202 and one or both of the application providers 206 and 207 may be the same entity, the application providers 206 and 207 in the present example are third-party providers and are separate entities from the outsourcing provider 202 and from each other. Accordingly, the outsourcing provider 202 has no access to the software on the application providers 206 and 207 other than what is provided by the application providers 206 and 207 and/or allowed by clients 104, 106, and 108.

The application provider 206 provides the software as one or more remotely accessible applications and/or application suites (hereinafter referred to collectively as applications) in a server or cloud based environment (e.g., using a software as a service (SAAS) model). The software may be provided to the clients 104 and 106 by the application provider 206 in different ways depending on the architecture of the application provider 206. For example, the application provider 206 may provide a separate instance of the application for each client 104 and 106, or may use a multi-tenant architecture as shown in which the application provides services to all clients 104 and 106 and the clients' data is partitioned. The application provider 207 may be similar or identical to the application provider 206 and provides software for client 108 and user 218.

To continue the example based on the client 104, the application functionality to which the client 104 has access via the tenant instance 208 may correspond to a financial management application to which the client 104 has subscribed to handle accounting services for payroll, tax, and/or other financial matters. The client 104 may access the application via a thin client using a web browser to upload data, configure application parameters, and otherwise access the application's functionality. Accordingly, the client 104 may enter employee information, salaries or rate per hour, hours worked, vacation time, and other payroll information into the application. The application calculates and settles the payroll, and may take other steps depending on the functionality of the application and the services to which the client 104 has subscribed. The client 104 only has access to the application as permitted by the application provider 206. Such access may be defined in a document such as a service agreement between the client 104 and the application provider 206.

In the present example, the clients 104, 106, and 108 have also subscribed to the outsourcing provider 202. The outsourcing service augmentation platform 204 is a multi-tenanted solution that views each client's presence on the application providers 206 and 207 as a tenant instance, with client 104 associated with tenant instance 208, client 106 associated with tenant instance 210, and client 108 associated with tenant instance 212. Each tenant instance 208, 210, and 212 is a unique, isolated application cloud environment dedicated to one client. It is noted that the tenant instances 208, 210, and 212 are from the perspective of the platform 204 and may or may not be identical to tenant instances as defined by the application providers 206 and 207. Accordingly, while the outsourcing provider 202 uses a tenant instance as defined by the application providers 206 and 207 in the present embodiment, it is understood that this may not be the case in other embodiments.

A user 218 is associated with the tenant instance 220, but is not a client of the outsourcing provider 202. In the present embodiment, the tenant instance 220 does not exist from the perspective of the platform 204 and is not accessible to the platform 204. If the user 218 were to become a client of the outsourcing provider 202, the tenant instance 220 would become accessible to the platform 204. In cases with a client-server application with a database data store, each tenant instance 208, 210, and 212 may have a separate database instance.

Accordingly, each client 104, 106, and 108 may use a particular application or application suite, such as a cloud based application suite of business software. The client interacts with the application normally (e.g., as allowed by the application providers 206 and 207). The platform 204 views the services provided by the application to the client and the associated data stored by the application as a tenant instance (including a dedicated database instance if needed) dedicated to that client. The platform 204 interacts with the application to provide services for the client. Communications between the clients 104, 106, and 108, the application providers 206 and 207, and the outsourcing provider 202 may occur through one or more networks 218, which may be any type of wireline and/or wireless network or networks suitable for such communications.

While each tenant instance 208, 210, and 212 may be dedicated to a single client, it is understood that a single client may be associated with multiple tenant instances. For example, each tenant instance 208, 210, and 212 may correspond to unique clients (e.g., each client may be associated with only one tenant instance), or multiple tenant instances (e.g., 208 and 210, or 208 and 212) may correspond to a single client. Depending on how the system 204 is configured, a single tenant instance may include access to multiple applications or may be limited to a single application.

A client may desire to outsource certain functions (e.g., a business function such as payroll), which may or may not use data controlled by the application. As will be described below in greater detail, the platform 204 leaves control of an application with the application providers 206 and 207 and the application's data with the corresponding client while outsourcing the desired functions. This process is largely transparent to the client and does not require the client to use a particular application or application suite simply to obtain outsourcing services from the platform 204 as long as the platform 204 is configured to interact with the software on the application providers 206 and 207.

To continue the example based on the client 104, the outsourcing provider 202 may be retained by the client 104 to provide payroll services, such as settlement and check printing. Accordingly, the platform 204 accesses data from the tenant instance 208 needed to handle the settlement. This access provides the platform 204 with aggregate data (e.g., not raw data), limiting the amount of information transferred to the outsourcing provider 202. Using the received aggregate information, the platform 204 is able to perform functions such as creating settlement files, completing the audit process, and printing checks. Although not shown, the platform 204 may provide the needed functionality using application on the platform 204 and/or using other software services, such as SAAS applications located elsewhere. For example, the platform 204 may use a SAAS application provided by another provider (not shown) in order to service its clients. Accordingly, the platform 204 enables the outsourcing provider 202 to interact with the application providers 206 and 207 to provide outsourcing services to clients 104, 106, and 108 while the clients maintain control of the applications and data corresponding to their tenant instances.

Representatives 214 and 216 may log into the platform 204 to handle client matters. In some embodiments, a representative (e.g., the representative 214) may also log into a tenant instance (e.g., the tenant instance 212). As will be described later in greater detail, the platform 204 presents a unified interface that allows a representative to be trained for the platform 204 and then service multiple clients. Because representatives do not need to learn a particular client system, a representative may be assigned to one or more roles within the support structure of the outsourcing provider 202 and perform that role for multiple clients. For example, a representative may be assigned to a payroll department within the outsourcing provider 202 and would process payroll events for clients 104, 106, and 108. Another representative may be assigned to a tax department to handle tax events. This provides for a highly scalable support structure with representative roles that may be filled in many different ways, such as by an employee or a contractor hired by the outsourcing provider 202, or an outside company (e.g., an accounting firm). A particular representative may then be able to interact with multiple instances to fulfill that role for those instances, enabling a much more streamlined and dynamically scalable support structure than traditional structures where a representative is typically assigned to a particular client.

Furthermore, information may be passed between the representatives 214 and 216 through the platform 204. For example, a representative handling payroll may process payroll for the tenant instance 208, and then the platform 204 may notify a representative in the tax department that action is needed based on the payroll processing. The platform 204 enables each representative to handle their designated role by interacting with the platform 204 and, if needed, by logging into a particular tenant instance. It is understood that actions may be performed by the outsourcing provider 202 and/or the client based on how a particular tenant instance is configured and the terms of any agreements between the outsourcing provider 202 and the client controlling that tenant instance.

Additional tenant instances may be added and, if needed, the processing capabilities of the platform 204 may be expanded without requiring logic that has to be customized for each particular additional tenant instance. For example, if the platform 204 is provided by a server cloud, the ability of the platform 204 to handle additional tenant instances may be expanded by providing (e.g., leasing or buying) more server capacity. The platform 204 may then use the expanded capacity to handle additional processing needs without the need to assign particular resources to a particular tenant instance until those resources are needed for that tenant instance. If a new application is developed and provided by the application provider 206 and/or 207, the platform 204 can be configured to interact with that application and a client may then use the services provided by the platform 204 with the new application. Accordingly, the platform 204 provides a scalable architecture that is able to handle events from applications servicing multiple tenant instances 208, 210, and 212, thereby providing a highly scalable model for services such as outsourcing.

The platform 204 also gives each client flexibility in selecting software that is suitable for that client's needs by enabling the client to use software that is not provided by the outsourcing provider 202. For example, a client may select off the shelf software or a cloud based software solution based on that client's particular needs. The client may also control the information that is made available to the platform 204, although it is understood that the platform 204 may need access to certain information in order to provide particular services to the client (e.g., payroll data to generate checks). By enabling each client to maintain control over their own data, the platform 204 provides transparency into what data the platform 204 is accessing and who is accessing the data. As will be described below, the client's tenant instance software performs calculations and provides aggregate data to the platform 204, which reduces the risk of delays due to errors. The ability to choose software and maintain control over data reduces the dependence of the clients on the platform 204 and enables each client to select other providers or to move services back in house relatively easily.

The outsourcing provider 202 using the platform 204 benefits as the provision of services is standardized within the platform 204 for all clients. This standardization makes the platform 204 easily scalable and enables the outsourcing provider 202 to assign service representatives to one or more areas or departments (e.g., taxes or payroll) within the provider's organization rather than to a specific client. Furthermore, the platform 204 can be easily expanded if additional processing capability is needed. As will be described, the platform 204 also provides analytical tools that enable the outsourcing provider 202 to view performance and other metrics for a single client or for multiple clients, which aids the outsourcing provider 202 in identifying and addressing inefficiencies both at a system level across multiple clients and at an individual client level.

Figure 3:
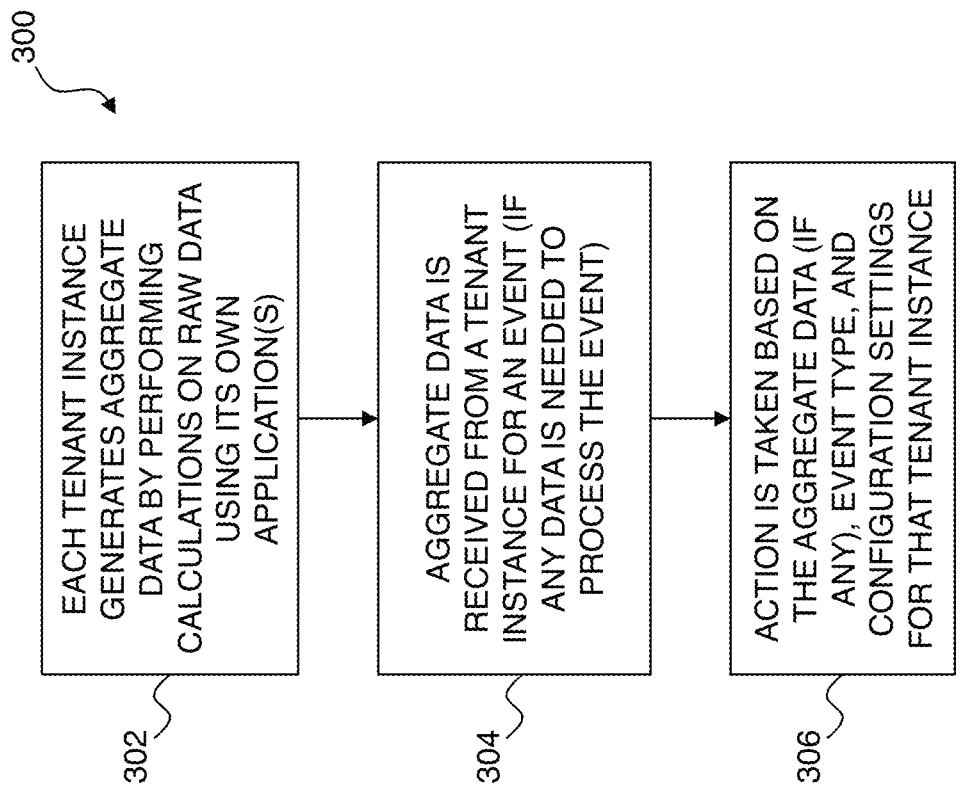
FIG. 3 illustrates a flow chart of one embodiment of a method that may be used within the environment of FIG. 2.

Referring to FIG. 3, a method 300 illustrates one embodiment of a process that may occur within the environment 200 of FIG. 2. In step 302, each tenant instance (e.g., the tenant instances 208, 210, and 212) uses the services provided by associated applications to perform its configured functions (e.g., payroll or tax calculations) using raw data that has been input or otherwise made available to the applications. In step 304, the platform 204 receives aggregate data (if needed) for an event that has triggered the involvement of the platform 204. The platform 204 may be configured to trigger based on various events, each of which may result in defined actions (e.g., a payroll event that triggers payroll processing). Some event triggers may not initiate data retrieval. For example, an event may occur that causes the platform 204 to post an update notice or send a request for supervisor approval, but not take any further action. In step 306, the platform 204 takes action based on the aggregate data (if any), the event type, and any configuration settings that may be defined on the platform 204 for that tenant instance.

Referring to FIG. 4A, a sequence diagram illustrates one embodiment of a process sequence 400 that may occur with the platform 204 of FIG. 2 with respect to a tenant instance (e.g., the tenant instance 208). In the present example, the platform 204 uses a push mechanism that waits for notifications from the tenant instance 208 that an event has occurred within the tenant instance. Accordingly, in step 402, the platform 204 listens for messages from the tenant instance 208. The listening may be a continuous process and is illustrated in FIG. 4A as continuing even while other steps are occurring.

In step 404, calculations are performed within the tenant instance 208, triggering an event notification. In step 406, the tenant instance 208 sends a notification message to the platform 204 indicating that an event has occurred in the tenant instance 208. The notification message may include the event type and/or other information.

In step 408, the platform 204 processes the event. This may include various intermediate steps, such as a step 410 where the platform 204 determines whether data is needed from the tenant instance 208 in order to process the event. For example, if the event is a payroll event, the platform 204 may need payroll information. In step 412, if data is needed from the tenant instance 208, the platform 204 requests the data. For example, if the data is provided via hypertext markup language (HTML) files, the platform 204 may retrieve the files using hypertext transfer protocol (HTTP) requests with or without encryption. In some embodiments, the platform 204 may request multiple files in parallel to speed up the retrieval process.

In step 414, the tenant instance 208 responds to the request of step 412 with the data. It is understood that steps 410-414 may be repeated during the processing of step 408. Some or all of the information resulting from the processing may be made available for viewing in various formats, including reports that may aggregate the information with information from other client instances, and/or may be returned to the tenant instance 208.

Figure 4B:
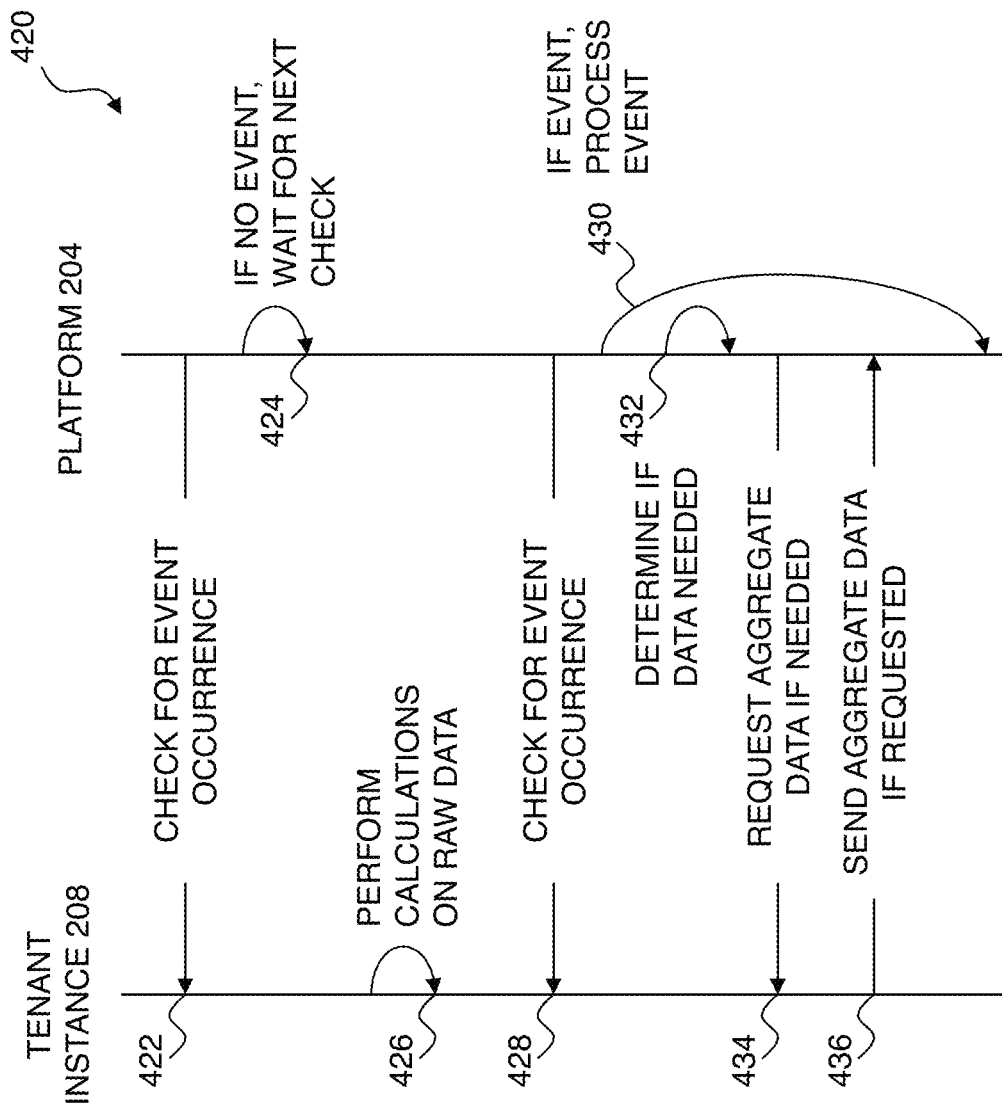

Referring to FIG. 4B, a sequence diagram illustrates one embodiment of a process sequence 420 that may occur with the platform 204 of FIG. 2 with respect to a tenant instance (e.g., the tenant instance 208). In the present example, the platform 204 uses a pull mechanism to check with the tenant instance 208 to determine whether an event has occurred, rather than listening for an event as described with respect to FIG. 4A. Accordingly, in step 422, the platform 204 checks with the tenant instance 208 to determine whether an event has occurred within the tenant instance 208. For example, the platform 204 may check (e.g., query) to see whether one or more files have been updated, whether a flag has occurred, and/or whether a particular process has been executed. In step 424, if no event has occurred, the platform 204 waits for the next check. It is understood that steps 422 and 424 may repeat any number of times until an event is detected. It is further understood that step 422 may occur at defined times and/or at defined intervals to prevent constant checks from occurring.

In step 426, calculations are performed within the tenant instance 208, triggering an event within the tenant instance 208. In step 428, the platform 204 checks with the tenant instance 208 to determine whether an event has occurred in the tenant instance 208. In step 430, if an event has occurred, the platform 204 processes the event. This may include various intermediate steps, such as a step 432 where the platform 204 determines whether data is needed from the tenant instance 208 in order to process the event. For example, if the event is a payroll event, the platform 204 may need payroll information. In step 434, if data is needed from the tenant instance 208, the platform 204 requests the data. In step 436, the tenant instance 208 responds to the request of step 434 with the data. It is understood that steps 432-436 may be repeated during the processing of step 430. Some or all of the information resulting from the processing may be made available for viewing in various formats, including reports that may aggregate the information with information from other client instances, and/or may be returned to the tenant instance 208.

Figure 5:
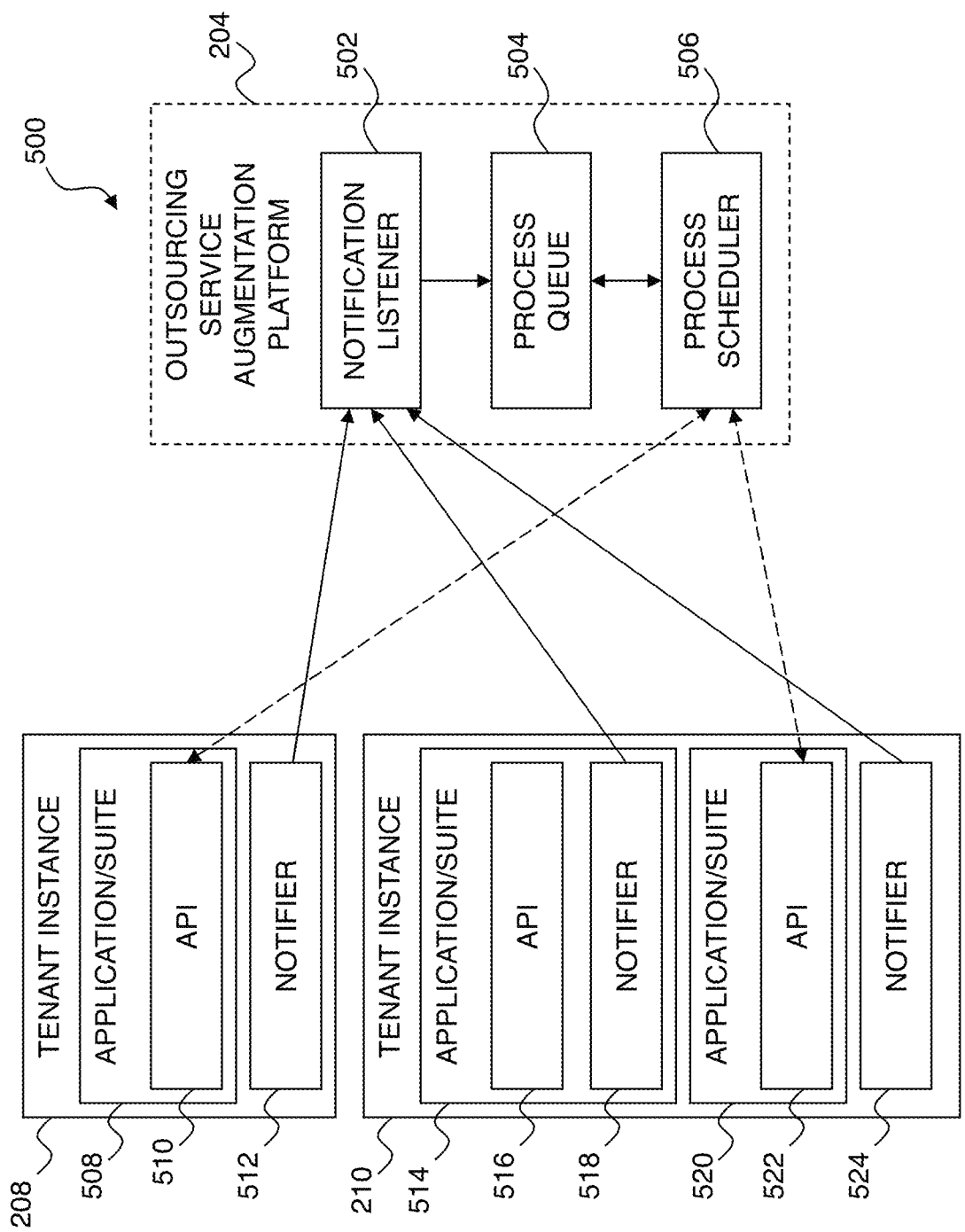
FIG. 5 illustrates one embodiment of the environment of FIG. 2.

Referring to FIG. 5, an environment 500 illustrates one embodiment of the platform 204 of FIG. 2. In the present example, the platform 204 includes a notification listener 502, a process queue 504, and a process scheduler 506. It is understood that some or all of the notification listener 502, process queue 504, and process scheduler 506 may be located on a single hardware platform or may be distributed (e.g., in a cloud environment).

The tenant instance 208 is associated with a single application/application suite 508, while the tenant instance 210 is associated with application(s)/application suite(s) 514 and 520. It is understood that these may be instantiated when needed (e.g., in a SASS environment) and an application itself may not actually reside in a tenant instance. The application 508 includes one or more Application Programming Interfaces (APIs) 510 and is associated with a notifier 512. The application 514 includes one or more APIs 516 and is associated with a notifier 518. The application 520 includes one or more APIs 522 and is not directly associated with a notifier. In some embodiments, APIs 516 and 522 may be a single API. For example, the applications 514 and 520 may belong to the same suite and a single API may be used to access both applications. A notifier may be associated with one or more particular applications (e.g., as shown with notifier 512 and application 508 and with notifier 518 and application 514) or may be associated with a tenant instance (e.g., as shown with notifier 524). In embodiments where a notifier is associated with a tenant instance rather than a single application, the notifier may be used for some or all applications associated with the tenant instance.

Using the tenant instance 208 as an example, the notifier 512 enables the platform 204 to provide services to the tenant instance 208. In this respect, the notifier 512 may be viewed as "outside" of the platform 204, but as the notifier 512 communicates with the notification listener 502, it may be viewed as "inside" the platform 204. In the present example, the notifier 512 is the only software that the platform 204 needs on the application provider 206 (e.g., the client side) to provide services using the application 508 within the tenant instance 208.

The actual implementation of a notifier may be depend on factors such as how the application/application suite handles events (e.g., whether there is an event queue to which other services can subscribe), whether the API provides for external subscription services or another method must be used, and how the platform 204 is configured. The APIs 510, 516, and 522 may also be used by the platform 204 to access the corresponding tenant instance for data retrieval. In some embodiments, the notification listener 502 and the notifiers 512, 518, and 524 may be viewed as a notification system.

For purposes of illustration, the applications 508 and 514 each represent an application or application suite such as Workday (a product of Workday, Inc., of Pleasanton, Calif.), while the application 520 represents another application. The platform 204, which may be configured to work with many different applications and application suites, is to provide outsourcing services using these two tenant instances of Workday. Each tenant instance 208 and 210 is separately controlled by the corresponding client.

It is understood that if Workday (or another application) provides notification functionality suitable for use with the platform 204, the notifier 512 may not be needed. For example, in such embodiments, the platform 204 may be able to register for event notification via APIs 510 and/or as otherwise provided by the particular application or application suite. In still other embodiments, the notifier 512 may queue the notification itself without the need for a notification listener 202. For example, the notifier 512 may contain the needed functionality to access the process queue 504 and queue notifications. The notification listener 502 may also perform validation functions to ensure that the message is from a trusted source and/or is a recognized message type.

The notification listener 502 receives notification messages from the tenant instances 208 and 210 (e.g., from the notifiers 512, 518, and 524). Each notification message may identify the particular application and tenant instance with which that message is associated, thereby enabling the platform 204 to handle all incoming messages the same way while still keeping the information for that particular tenant instance separate from the information for the other tenant instances. This enables the platform 204 to scale as additional tenant instances are added and also enables additional functionality to be added to the platform 204 without changing the basic operation of the notification system.

The process queue 504 stores notifications received from the notification listener 502. It is understood that the process queue 504 may store notification messages, events, and/or other indicators that action is needed by the process scheduler 506. For example, in some embodiments, a notification message may indicate an event type and provide information regarding the event. The notification message may be queued for later processing. In other embodiments, the notification message may be discarded and the notification message may select and queue the corresponding event rather than the notification message. In still other events, the notification may carry an event and the event may be extracted from the notification message and queued. For example, if the notifier 512 is configured to send a Workday event, the notifier 512 may be encapsulate the event in a message and send the message. The event may be extracted from the message and processed just as if the event had been received in the process queue directly from Workday.

In other embodiments, the notifier 512 may be configured to send a message representing the event but not actually containing the event. For example, the notifier 512 may use an event identifier that is read by the notification listener 502 or process scheduler 506 to determine what type of event has occurred. For purposes of illustration, notifications may be referred to as either messages or events, with the understanding that the platform 204 may be implemented in different ways.

The process scheduler 506 retrieves messages from the process queue 504 and processes the messages according to the type of event represented by each message. Accordingly, the process scheduler 506 may be configured to handle new event types as needed.

Figure 6:
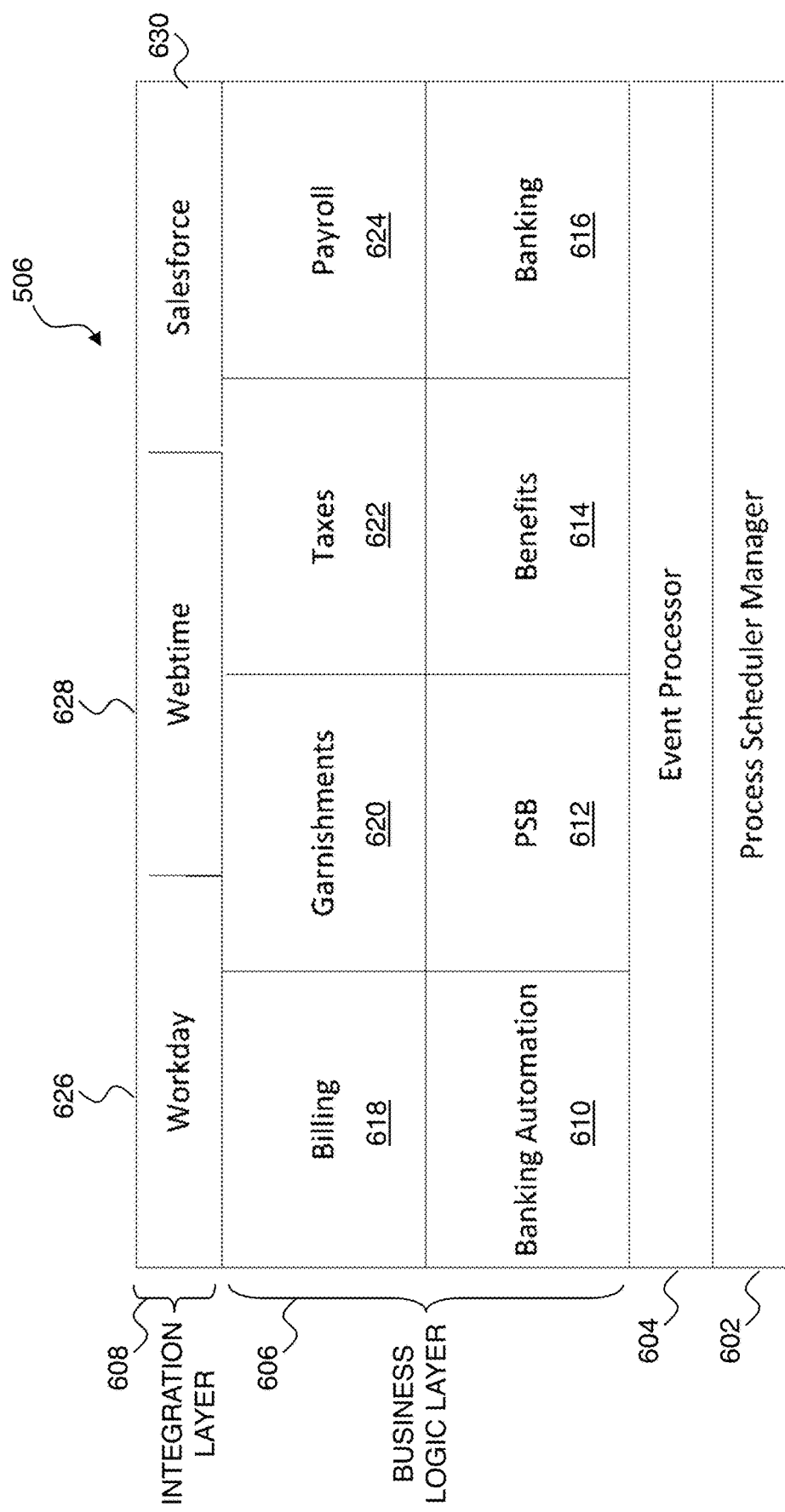
FIG. 6 illustrates one embodiment of a process manager that may be used within the environment of FIG. 5.

Referring to FIG. 6, one embodiment of the process scheduler 506 of FIG. 5 is illustrated in greater detail. In the present example, the process scheduler 506 is modular and includes a process scheduler manager 602, an event processor 604, a business logic layer 606, and an integration layer 608. The process scheduler manager 602 manages the process queue 504 and controls the process scheduler resource load by spawning new processes to work on a particular business function of the business logic layer 606. The event processor 604 controls the life cycle of an event and hands the event off to the proper business function residing in the business logic layer 606. The event processor 604 may also manage error handling and the updating of process queue messages.

The business logic layer 606 includes various functions for handling particular event types. In the present example, the functions may be provided by modules, such as a banking automation module 610, a payroll status board (PSB) module 612, a benefits module 614, a banking module 616, a billing module 618, a garnishments module 620, a taxes module 622, and a payroll module 624. It is understood that there may be more or fewer modules and the process scheduler 506 may be configured for a particular client by using or not using modules as needed.

The banking automation module 610 may handle functions such as automatically sending files into the banking system, tracking acknowledgements on files successfully transferred, and tracking confirmations on wires successfully sent into the system. The PSB module 612 may handle functions such as updating PSB data based on outsourcing events for the purpose of task tracking and analytics on payroll, garnishment, and tax processing. The benefits module 614 may handle functions such as tracking benefit events to track and manage benefit administration processing. The banking module 616 may handle functions such as the creation of wire, reverse wire, and ACH files for collecting funds for garnishments, the creation of wire, reverse wire, and ACH files for collecting funds for taxes, and the creation of wire, reverse wire, and ACH files for collecting funds for payroll. The billing module 618 may handle functions such as the collection of employee and payment billing counts, the automatic creation of invoices in a billing system of the platform 204, and the updating of employee and payments counts via the PSB module 612. The garnishments module 620 may handle functions such as the creation of garnishment wage attachment (WAG) files that are to be loaded into a financial program such as Master Tax (a product of Master Tax, LLC, of Scottsdale, Ariz.) for processing. The tax module 622 may handle functions such as the creation of payroll tax summary (PTS) files to be loaded into Master Tax for processing taxes. The payroll module 624 may handle functions such as direct deposits and checks, and the creation of check printing files that may be automatically sent into printer queues for printing.

The integration layer 608 controls communication between the platform 204 and other systems and/or applications. In the present example, the integration layer 608 includes a Workday interface 626, a Webtime interface 628, and a Salesforce interface 630, but it is understood that the integration layer 608 may enable and control communications with many different systems and/or applications. Furthermore, it is understood that the interfaces 626, 628, and 630 may be a single interface in some embodiments, and the process scheduler 506 may communicate via that interface with various systems and/or applications.

Figure 7:
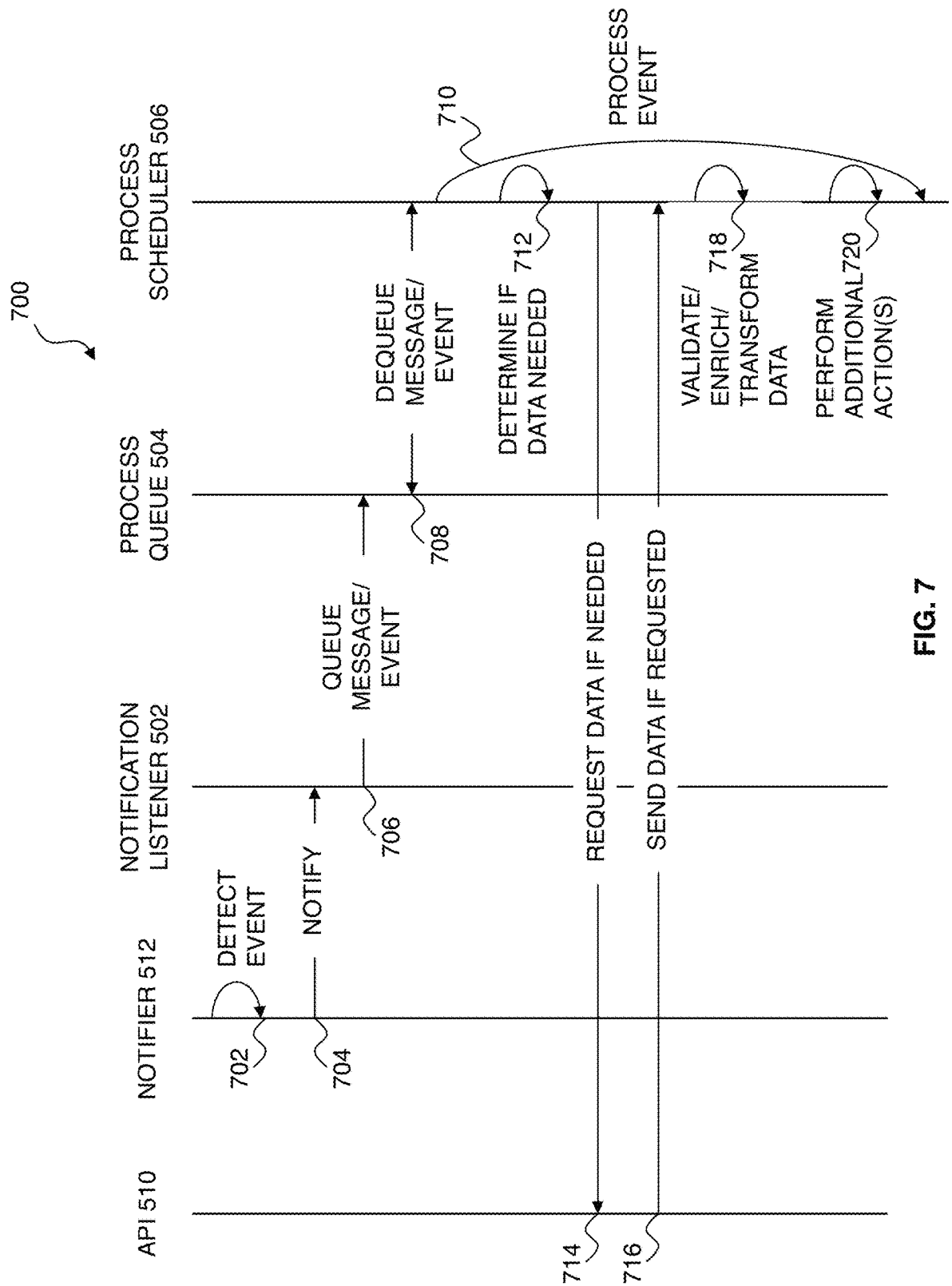
FIG. 7 illustrates a sequence diagram representing one embodiment of information flow that may occur within the environment of FIG. 5.

Referring to FIG. 7, a sequence diagram 700 illustrates one embodiment of a process sequence that may occur with the platform 204 of FIG. 5 with respect to a tenant instance (e.g., the tenant instance 208). In step 702, an event in the tenant instance 208 is detected by the notifier 512 or by another detection mechanism, such as a notification process of the application corresponding to the tenant instance 208. For purposes of example, the notifier 512 has subscribed to particular events in the tenant instance 208. In step 704, after the notifier 512 detects a subscribed event, it sends a message to the platform 204 (e.g., to the notification listener 502). In the present example, the message is an extensible markup language (XML) message and includes information identifying the event type and the tenant instance 208. However, it is understood that in other embodiments, the message may contain minimal information and the notification listener 502 may query the application 508 for additional information, or may queue a message indicating an event is to be processed and the process scheduler 506 may query the application 508 for additional information during handling of the event.

In step 706, the notification listener 502 queues the message in the process queue 504 for the process scheduler 506. In step 708, the process scheduler 506 dequeues the message for processing. In step 710, the process scheduler 506 begins processing the event. The processing of step 710 may include various steps, such as steps 712-720. Accordingly, in step 712, the process scheduler 506 determines whether data is needed to process the event identified in the message. For example, if the event is a payroll event, the process scheduler 506 may determine that payroll information is needed from payroll calculations that have already been performed by the Workday application 508 that is within the tenant instance 208. In step 714, if data is needed, the process scheduler 506, via the integration layer 608, requests the data from the application 508 via API 510. In step 716, the application 508 uses API 510 to return the requested data to the process scheduler 506.

If no data is needed as determined in step 712, the process may skip from step 712 to step 718. In step 718, the process scheduler 506 may process the data (e.g., validate, enrich, and/or transform the data) if needed to prepare the data for use within the platform 204. If step 718 is not needed, the process may skip to step 720. In step 720, one or more additional actions may be taken. Examples of such actions are described later with respect to FIGS. 11A-13B. It is understood that one or more of steps 712-720 may be repeated as needed during the processing of step 710.

Figure 8:
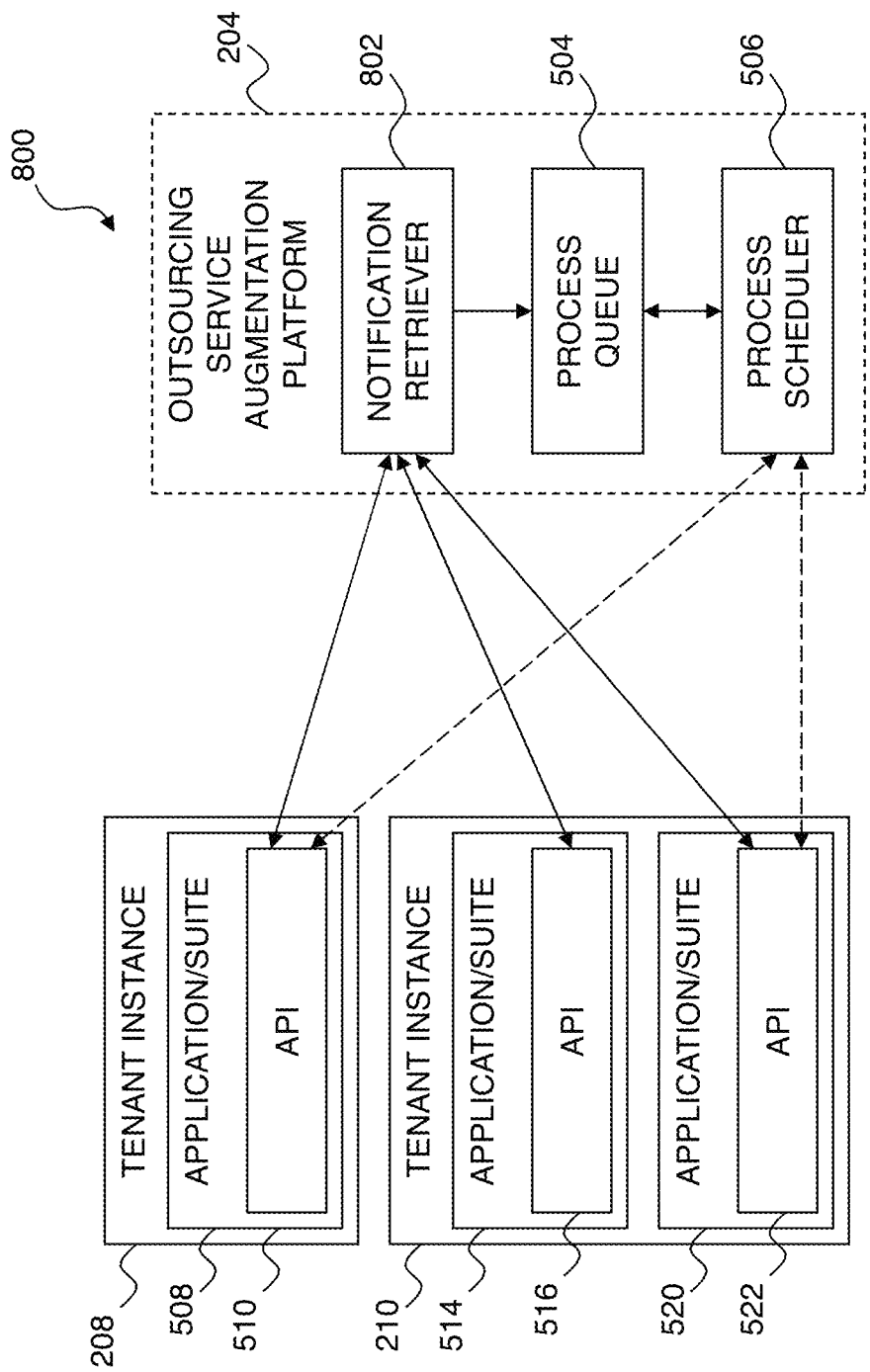
FIG. 8 illustrates another embodiment of the environment of FIG. 2.

Referring to FIG. 8, an environment 800 illustrates one embodiment of the platform 204 of FIG. 2. In the present example, the platform 204 includes a notification retriever 802, the process queue 504, and the process scheduler 506. The use of the notification retriever 802, rather than the notification listener 502 of FIG. 5, means that notifiers may not needed in the tenant instances 208 and 210. The tenant instances 208 and 210 are similar or identical to those of FIG. 5, except for the lack of notifiers, and are not described in detail in the present example. The process queue 504 and process scheduler 506 are also the same as those of FIG. 5.

The notification retriever 802 enables the platform 204 to obtain event information from the tenant instances 208 and 210 without relying on the presence of a notifier. Accordingly, in the present example, the platform 204 does not need any software or custom code within the tenant instances 208 and 210. The notification retriever 802 may, for example, make calls into the applications 508, 514, and/or 520 via their respective APIs 510, 516, and 522. It is understood that the applications and APIs must be configured to allow this type of call to occur, and so the notification retriever 802 may not be viable in embodiments where such functionality is blocked through configuration settings or the application/API does not provide such functionality. If not viable, a notifier or another method for obtaining information from the applications 508, 514, and/or 520 may be used. It is understood that the same method may not be used for all applications. For example, the applications 508 and 514 may allow the use of the notification retriever, while the application 520 may not allow such access and may require the use of a notifier.

Figure 9:
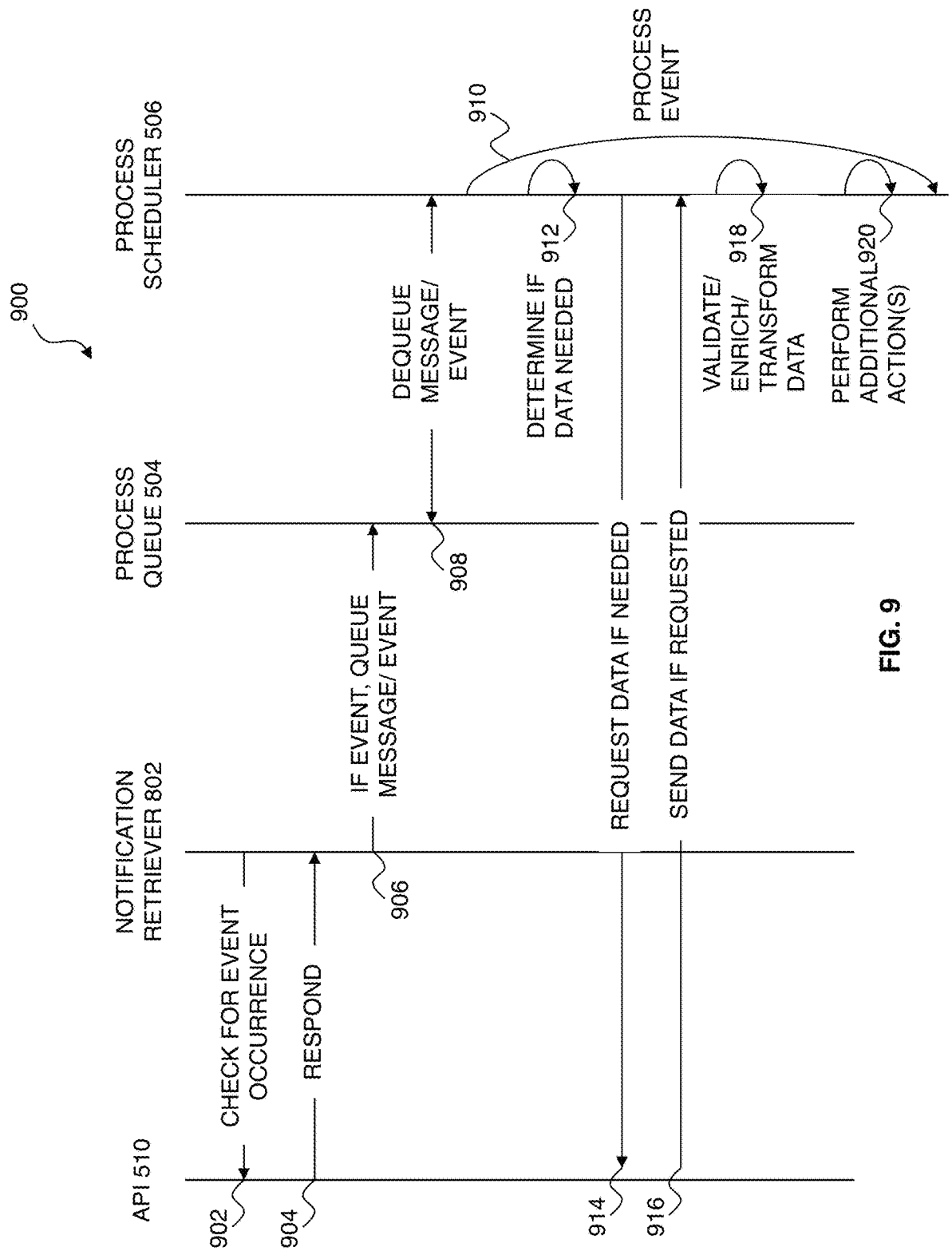
FIG. 9 illustrates a sequence diagram representing one embodiment of information flow that may occur within the environment of FIG. 8.

Referring to FIG. 9, a sequence diagram 900 illustrates one embodiment of a process sequence that may occur with the platform 204 of FIG. 8 with respect to a tenant instance (e.g., the tenant instance 208). In step 902, the notification retriever 802 calls into the application 508 to check for the occurrence of one or more events. For example, the notification retriever 802 may query the API 510 to determine if particular events have occurred. In step 904, the notification retriever 802 receives a response indicating whether an event has occurred. In the present example, the response includes information about events that have occurred. However, it is understood that in other embodiments, the notification retriever 802 may query the application 508 for additional information, or may queue a message indicating an event is to be processed and the process scheduler 506 may query the application 508 for additional information during handling of the event.

In step 906, the notification retriever 802 queues the message in the process queue 504 for the process scheduler 506. In step 908, the process scheduler 506 dequeues the message for processing. In step 910, the process scheduler 506 begins processing the event. The processing of step 910 may include various steps, such as steps 912-920. Accordingly, in step 912, the process scheduler 506 determines whether data is needed to process the event identified in the message. For example, if the event is a payroll event, the process scheduler 506 may determine that payroll information is needed from payroll calculations that have already been performed by the Workday application 508 that is within the tenant instance 208. In step 914, if data is needed, the process scheduler 506, via the integration layer 608, requests the data from the application 508 via API 510. In step 916, the application 508 uses API 510 to return the requested data to the process scheduler 506.

If no data is needed as determined in step 912, the process may skip from step 912 to step 918. In step 918, the process scheduler 506 may process the data (e.g., validate, enrich, and/or transform the data) if needed to prepare the data for use within the platform 204. If step 918 is not needed, the process may skip to step 920. In step 920, one or more additional actions may be taken. Examples of such actions are described later with respect to FIGS. 11A-13B. It is understood that one or more of steps 912-920 may be repeated as needed during the processing of step 910.

Figure 10A:
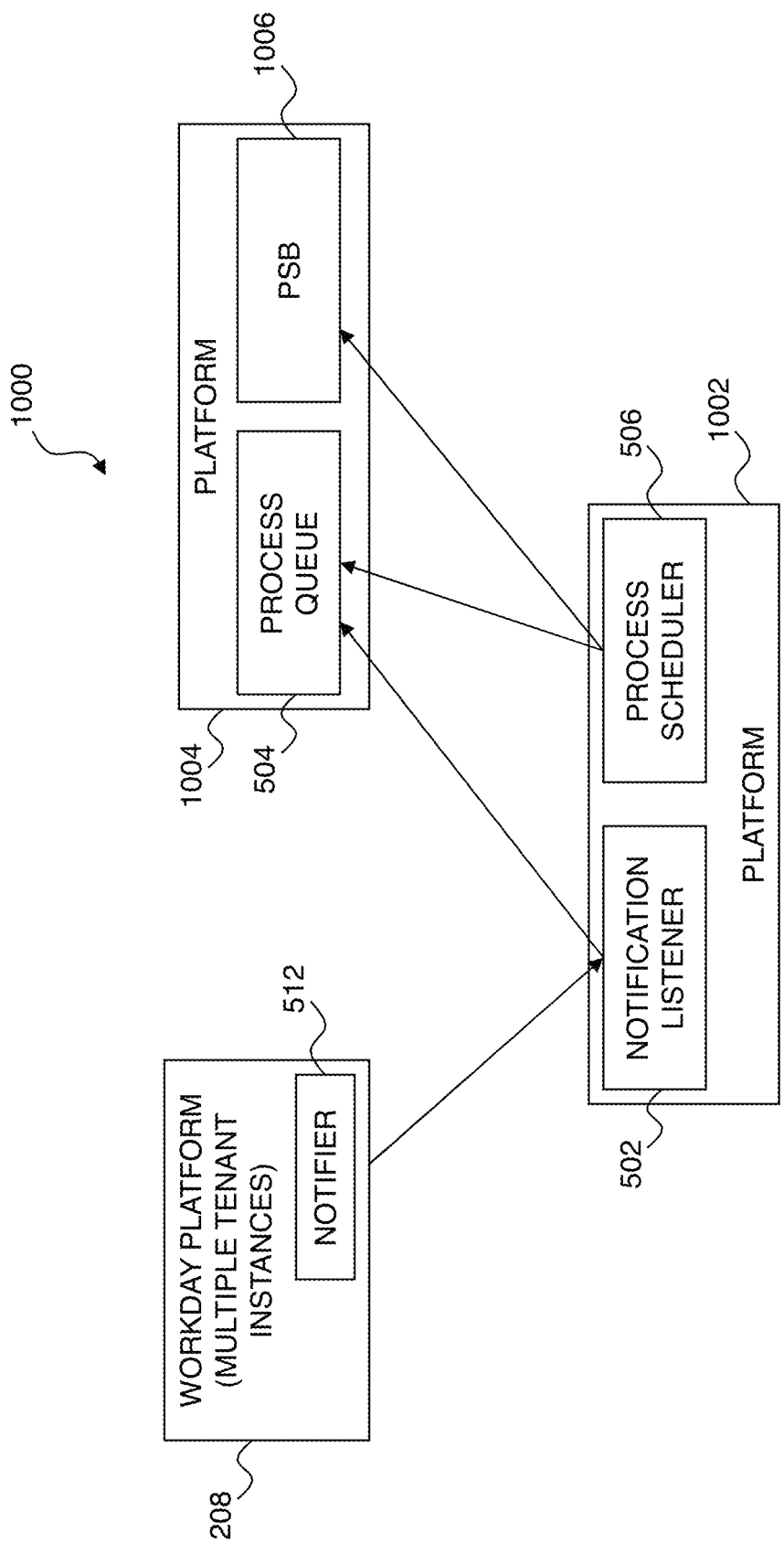
FIG. 10A illustrates yet another embodiment of the environment of FIG. 2.

Referring to FIG. 10A, an environment 1000 illustrates one embodiment of the platform 204 of FIG. 2. In the present example, the platform 204 is distributed, with different functions residing on different platforms 1002 and 1004. For purposes of example, the platform 1002 may be a platform provided by a secure cloud hosting provider such as Firehost (of Dallas, Tex.) and the platform 1004 may be a platform provided by an enterprise cloud computing provider such as Salesforce (of San Francisco, Calif.). The notification listener 502 (and/or notification retriever 802) and process scheduler 506 may be located on the platform 1002, and the process queue 504 and a PSB 1006 may be located on the platform 1004. It is understood that the components of the platform 204 may be distributed using other arrangements and the environment 1000 simply provides one of many possible embodiments.

The environment 1000 enables the platform 204 to be built and/or located on different platforms, making the platform 204 easily scalable. For example, if additional storage space (e.g., memory) and/or processing power is needed to handle tenant instances, the operator of the platform 204 may either obtain more storage and/or processing power (e.g., lease or otherwise provide) or may move to another platform that provides the needed resources. This scalability enables the provider of the platform 204 to scale the system as tenant instances are added.

Figure 10B:
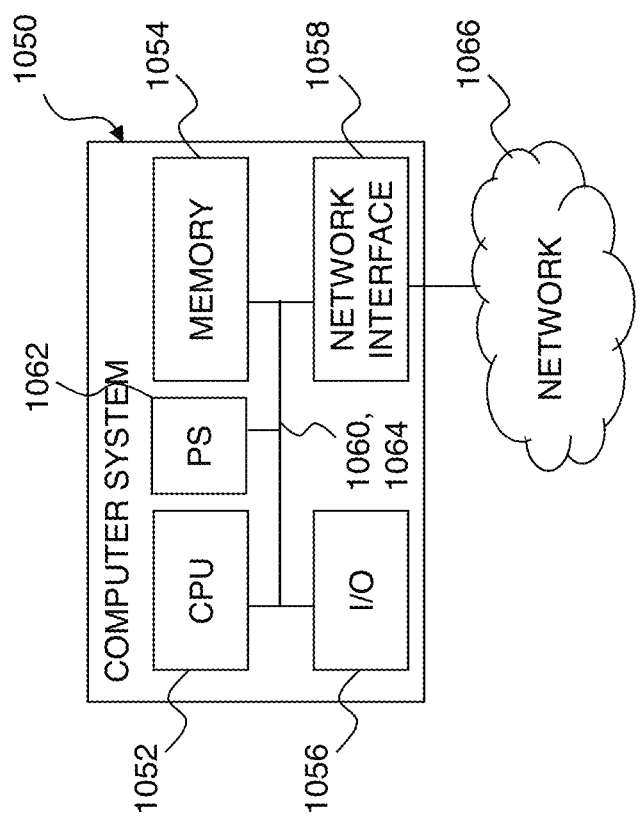
FIG. 10B illustrates one embodiment of a computer system that may be used within the environment of FIG. 2.

Referring to FIG. 10B, one embodiment of a computer system 1050 is illustrated. The computer system 1050 is one possible example of a system component or device that may be used within the environment 200 of FIG. 2. The computer system 1050 may include a controller (e.g., a central processing unit (CPU)) 1052, a memory unit 1054, an input/output (I/O) device 1056, and a network interface 1058. The components 1052, 1054, 1056, and 1058 are interconnected by a data transport system (e.g., a bus) 1060. A power supply (PS) 1062 may provide power to components of the computer system 1050 via a power transport system 1064 (shown with data transport system 1060, although the power and data transport systems may be separate). It is understood that the computer system 1050 may be differently configured and that each of the listed components may actually represent several different components. For example, the CPU 1052 may actually represent a multi-processor or a distributed processing system; the memory unit 1054 may include different levels of cache memory, main memory, hard disks, and remote storage locations; the I/O device 1056 may include monitors, keyboards, and the like; and the network interface 1058 may include one or more network cards providing one or more wired and/or wireless connections to a network 1066. Therefore, a wide range of flexibility is anticipated in the configuration of the computer system 1050.

The computer system 1050 may use any operating system (or multiple operating systems), including various versions of operating systems provided by Microsoft (such as WINDOWS), Apple (such as Mac OS X), UNIX, and LINUX, and may include operating systems specifically developed for handheld devices, personal computers, servers, and cloud environments depending on the use of the computer system 1050. The operating system, as well as other instructions, may be stored in the memory unit 1054 and executed by the processor 1052. For example, the memory unit 1054 may include instructions for performing some or all of the methods described herein and for providing the platform 204.

The network 1066 (which may be the network 218) may be a single network or may represent multiple networks, including networks of different types. For example, the network 1066 may include one or more cellular links, data packet networks such as the Internet, local area networks (LANs), and/or wide local area networks (WLAN), and/or Public Switched Telephone Networks (PSTNs). Accordingly, many different network types and configurations may be used to couple the computer system 1050 to other components of the environment 200 of FIG. 2.

Figure 11A:
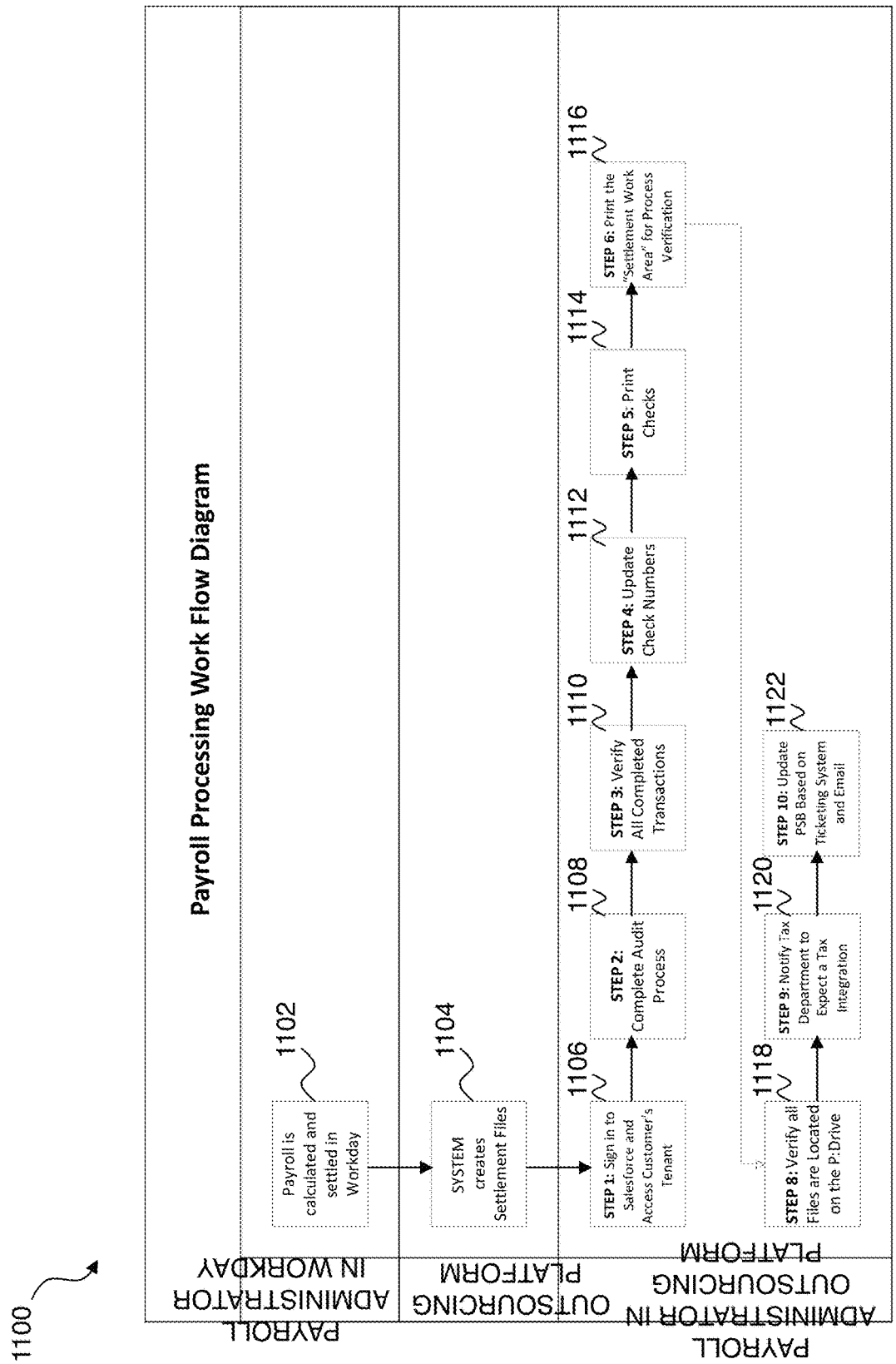
FIG. 11A illustrates one embodiment of a payroll processing work flow that may occur within the environment of FIG. 2.

Referring to FIG. 11A, a diagram 1100 illustrates one embodiment of a payroll processing work flow that may be used within the environment 200 of FIG. 2. For purposes of example, the tenant instance 208 includes Workday as the application 508 (FIG. 5). One or more payroll administrators or other authorized individuals (referred to herein for purposes of clarity as the "payroll administrator" due to the function being performed regardless of their actual position) handles certain actions that are performed within the tenant instance 208 and other actions that are performed within the platform 204. Still other actions may be handled by the platform 204 (e.g., by the process scheduler 506 of FIG. 8) either automatically or after being initiated by a user. The payroll administrator may be from either the client 104 or the outsourcing provider 202 (e.g., the representative 214) depending on the particular embodiment. For example, the client may handle actions performed in Workday, and the outsourcing provider 202 may handle actions performed within the platform 204. In other embodiments, the outsourcing provider 202 may handle actions performed both within Workday and within the platform 204. It is understood that applications other than Workday may be used, and that the present example is not limited to Workday.

In step 1102, payroll is calculated and settled in Workday within the tenant instance 208 by a payroll administrator from either the client 104 or the outsourcing provider 202. For example, step 1102 may be performed by either the client 104 or the representative 214. Accordingly, step 1102 is performed within the tenant instance 208 using Workday and the client's data with no information leaving the client's control.

In step 1104, the platform 204 creates settlement files after retrieving the needed information from the tenant instance 208 as described in previous embodiments (e.g., after receiving an event notification that payroll has been settled and requesting the needed data). As described previously, the retrieved information is aggregate data from the client's tenant instance 208.

In step 1106, a multi-step process begins with the payroll administrator signing into the platform 204 and accessing the tenant instance 208 (e.g., by clicking on a link leading to the tenant instance 208). It is understood that some of the following steps may include Workday, but are shown as being performed via the platform 204 since the payroll administrator signs into the platform 204 to begin the process. In the present example, step 1106 and the following steps are performed by the representative 214 and not by the client as the client will generally not have access to the needed functionality of the platform 204.

In step 1108, the payroll administrator completes the audit process. In step 1110, the payroll administrator verifies all completed transactions. In step 1112, the payroll administrator updates the check numbers. In step 1114, the payroll administrator prints the checks. In step 1116, the payroll administrator prints the "settlement work area" for process verification. In step 1118, the payroll administrator verifies that all files are located at the correct location (e.g., a particular storage location). In step 1120, the payroll administrator notifies the tax department to expect a tax integration. For example, this notification may be received by the representative 216 via the platform 204. In step 1122, the payroll administrator updates the PSB based on the ticketing system and email.

Figure 11B:
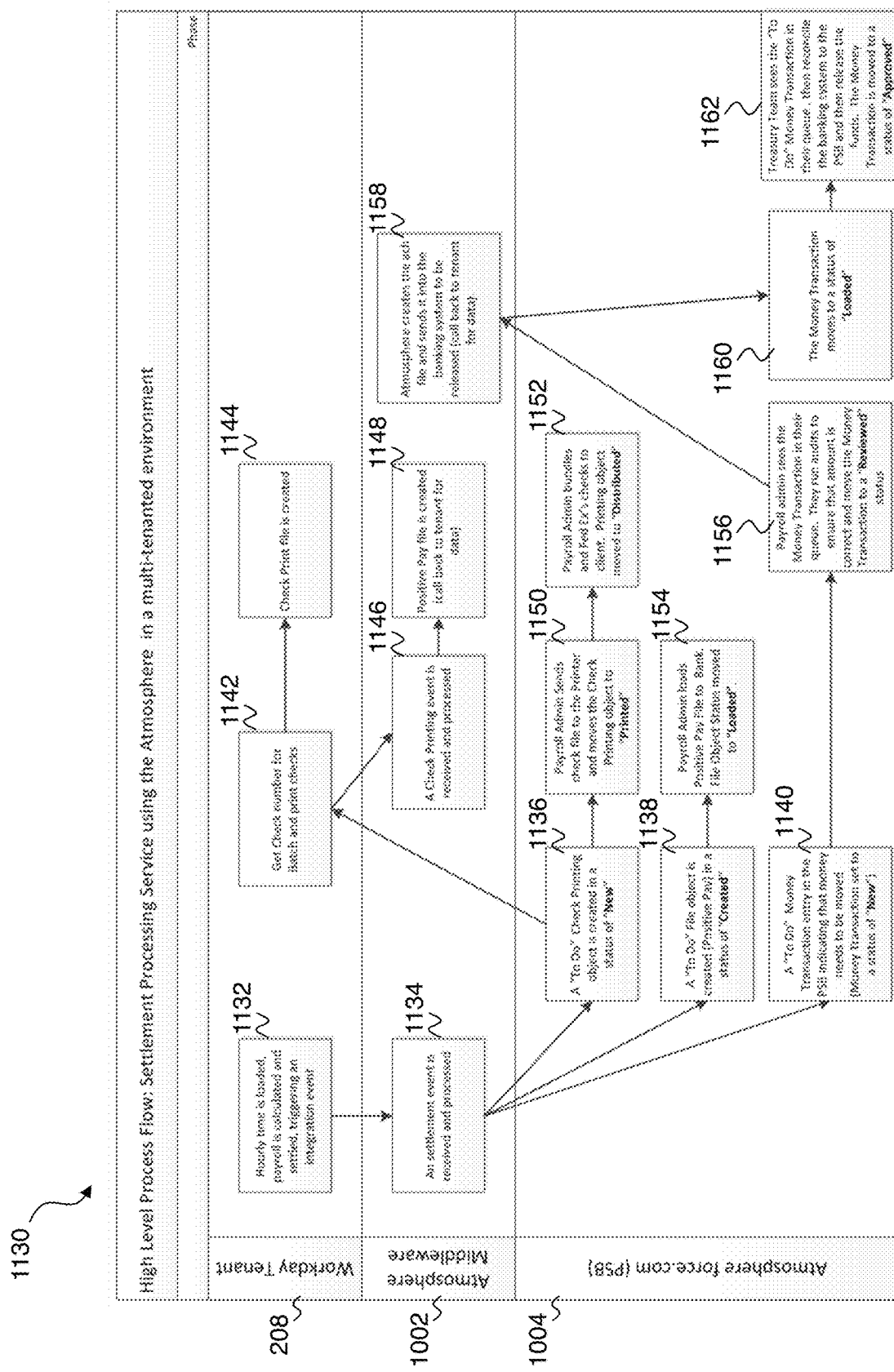
FIG. 11B illustrates one embodiment of a work flow similar or identical to that of FIG. 11A from a system perspective.

Referring to FIG. 11B, a diagram 1130 illustrates one embodiment of a settlement processing service work flow that may be used within the environment 200 of FIG. 2. The diagram 1130 illustrates the work flow from a system perspective, rather than the more personnel oriented perspective of FIG. 11A. In the present embodiment, the environment 200 is configured as shown in FIG. 10A, although it is understood that the platform 1002 and 1004 may be combined or otherwise configured differently in other embodiments. For purposes of example, the tenant instance 208 includes Workday as the application 508 (FIG. 5).

In step 1132, hourly time is loaded and payroll is calculated and settled in the tenant instance 208, which triggers an integration event (e.g., a notification). In step 1134, the platform 1002 receives and processes a settlement event. This step results in three steps 1136, 1138, and 1140 on the platform 1004.

In step 1136, a "To Do" check printing object is created with a status of "new." From step 1136, the tenant instance 208 is used to obtain check number(s) for the batch and to print checks in step 1142. This results in step 1144, which creates a check print file in the tenant instance 208. Step 1142 also results in step 1146, in which a check printing event is received by the platform 1002 from the tenant instance 208 and processed. In step 1148, a positive pay file is created and the platform 1002 may call back into the tenant instance 208 for additional data for this step. Step 1136 also results in step 1150, in which a payroll administrator accessing the platform 1002 sends the check file to the printer and changes the check printing object's status to "printed." In step 1152, the payroll administrator bundles and sends the checks to the client (e.g., via a service such as Federal Express (FedEx), the United Parcel Service (UPS), or the United States Postal Service (USPS)). The status of the printing object is then changed to "distributed."

In step 1138, a "To Do" positive pay file object is created with a status of "created." In step 1154, the payroll administrator sends (e.g., uploads or otherwise enters) the positive pay file to a bank, and the object's status is changed to "loaded."

In step 1140, a "To Do" money transaction entry is made in the PSB indicating that money needs to be moved. The money transaction's status is set to "new." In step 1156, the payroll administrator sees the money transaction in their queue and runs audits to ensure the amount is correct. The money transaction's status is changed to "reviewed." In step 1158, the platform 1002 creates the ACH file and sends it to the banking system to be released. This step may call back into the tenant instance 208 for data. In step 1160, the money transaction's status is changed to "loaded" on the platform 1104. In step 1162, the treasury team sees the "To Do" money transaction in their queue. The treasury team reconciles the banking system to the PSB and then releases the funds. The money transaction's status is changed to "approved."

Referring to FIGS. 11C and 11D, tables 1170 and 1180, respectively, illustrate embodiments of two models that may be used to apportion payroll service responsibilities between the outsourcing provider 202 and a client, such as the client 104, within the environment 200 of FIG. 2. It is understood that the platform 204 enables responsibilities to be apportioned in many different ways other than those illustrated in tables 1170 and 1180, with some clients having more involvement than others depending on the particular model that is used. The payroll processing work flow remains the same regardless of which model is used, allowing the apportionment to occur without requiring changes to the work flow. This gives the outsourcing provider 202 a great deal of flexibility in servicing clients without changing the manner in which the services are delivered.

In the present example, table 1170 is directed to a payroll settlement services model and table 1180 is directed to a payroll administrative services model (which includes the payroll settlement services model of table 1170). From the perspective of the outsourcing provider 202, the two models are similar with the payroll administrative services model (table 1180) including payroll configuration and payment management responsibilities that the payroll settlement services model of table 1170 does not. Additionally, the payroll administrative services model (table 1180) includes more support services (e.g., answering questions and helping the client's employees) than the payroll settlement services model of table 1170. All services offered in the payroll settlement services model are covered by the payroll administrative services model. This is summarized below in Table 1, although it is understood that many different changes may be made to the models, such as the billing metric and billing frequency.

TABLE 1

| Service | Billing Metric | Billing Frequency | Description of Provider Responsibilities |
|---|---|---|---|
| Payroll Settlement Services | Per Payment | Monthly | Process and payment of employee checks and direct deposits. Provide treasury management of payroll funds. |
| Payroll Administrative Services | Per Payment | Monthly | Standard administration of payroll that includes maintenance of payroll configuration, payment management and processing of payroll. Payroll administrative services include the payroll settlement services. |

Referring specifically to FIG. 11C, the payroll settlement services model of table 1170 includes the outsourcing provider 202 settling payroll, and preparing and distributing payroll checks and direct deposits using the provider's accounts. The outsourcing provider 202 assigns payroll representatives to handle these tasks. Table 1170 includes a column 1172 listing various services and related tasks that are to be performed for that service. Columns 1174 and 1176 represent the outsourcing provider 202 and client 104, respectively. An "X" in one of columns 1174 and 1176 denotes whether the outsourcing provider 202 or client 104 is responsible for that task.

Referring specifically to FIG. 11D, the payroll administrative services model of table 1180 includes the outsourcing provider 202 settling payroll, and preparing and distributing payroll checks and direct deposits using the provider's accounts. The outsourcing provider 202 assigns payroll representatives who may answer any questions regarding payroll, manage new earning and deduction codes, and manage the Workday update process. Table 1180 includes a column 1182 listing various services and related tasks that are to be performed for that service. Columns 1184 and 1186 represent the outsourcing provider 202 and client 104, respectively. An "X" in one of columns 1184 and 1186 denotes whether the outsourcing provider 202 or client 104 is responsible for that task.

Figure 12A:
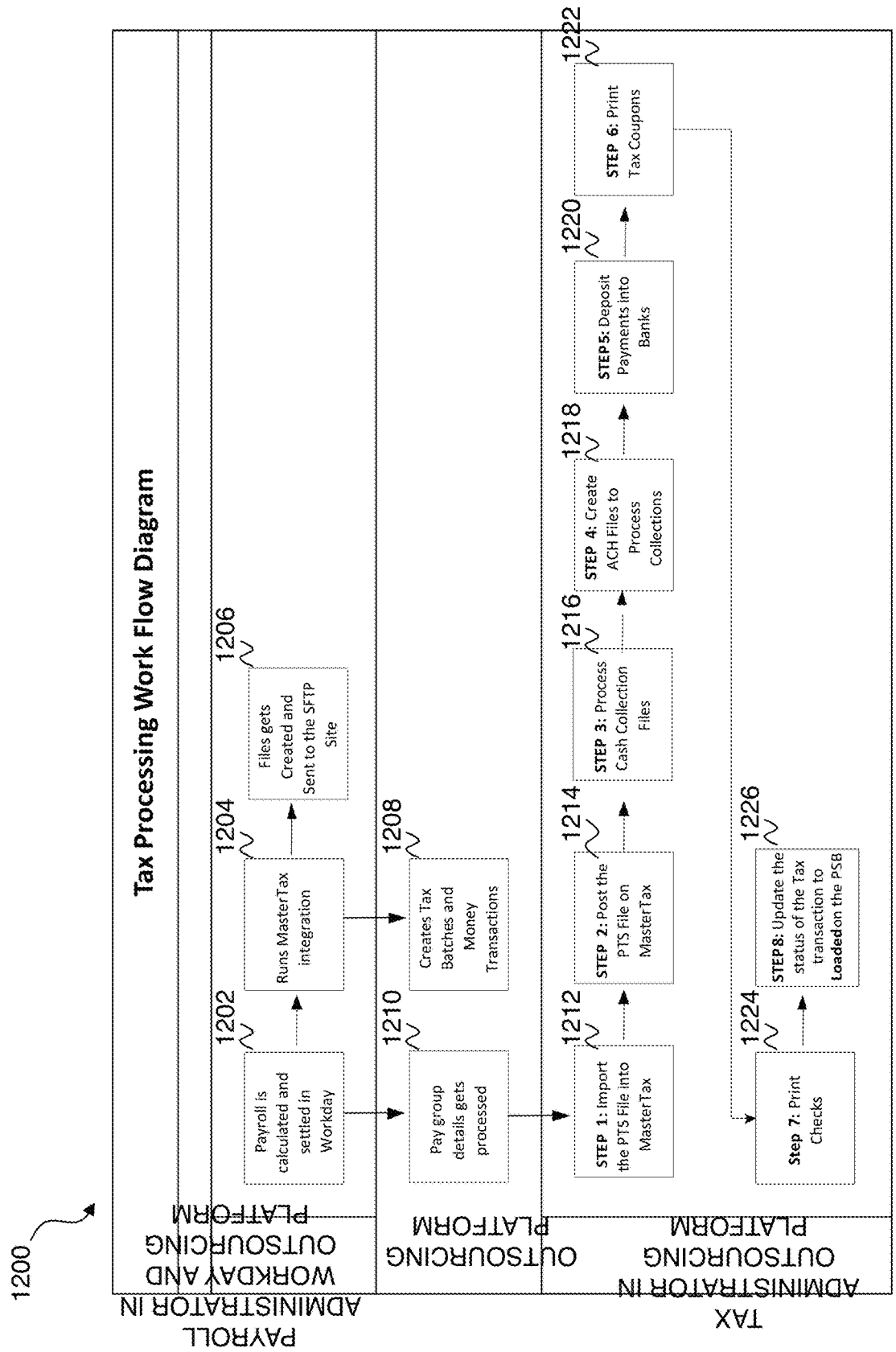
FIG. 12A illustrates one embodiment of a tax processing work flow that may occur within the environment of FIG. 2.

Referring to FIG. 12A, a diagram 1200 illustrates one embodiment of a tax processing work flow that may be used within the environment 200 of FIG. 2. For purposes of example, the tenant instance 208 includes Workday as the application 508 (FIG. 5). One or more payroll administrators, tax administrators, and/or other authorized individuals handles certain actions that are performed within the tenant instance 208 and other actions that are performed within the platform 204. Still other actions may be handled by the platform 204 (e.g., by the process scheduler 506 of FIG. 8) either automatically or after being initiated by a user. The payroll and tax administrators may be from the client 104 and/or the outsourcing provider 202 (e.g., the representatives 214 and 216) depending on the particular embodiment. It is understood that applications other than Workday may be used, and that the present example is not limited to Workday.

In step 1202, payroll is calculated and settled in Workday within the tenant instance 208 by a payroll administrator from either the client 104 or the provider 212. For example, step 1202 may be performed by either the client 104 or the representative 214. In step 1204, a integration is run. The present embodiment uses a program such as Master Tax for purposes of example, but it is understood that any tax program having the needed functionality may be used. In step 1206, files are created and sent to a site such as a secure file transfer protocol (SFTP) site. Accordingly, steps 1202-1206 are performed within the tenant instance 208 and may be performed by either the client 104 or the outsourcing provider 202.

In step 1208, the platform 204 creates tax batches and money transactions based on step 1208. In step 1210, the system processes pay group details based on step 1202.

In step 1212, a multi-step process begins with the tax administrator importing a PTS file into a tax program. In step 1214, the tax administrator posts the PTS file on Master Tax. In step 1214, the tax administrator processes tax collection files. In step 1218, the tax administrator creates ACH files to process collections. In step 1220, the tax administrator deposits payments into banks. In step 1222, the tax administrator prints tax coupons. In step 1224, the tax administrator prints checks. In step 1226, the tax administrator updates the status of the tax transaction to "Loaded" on the PSB.

Figure 12B:
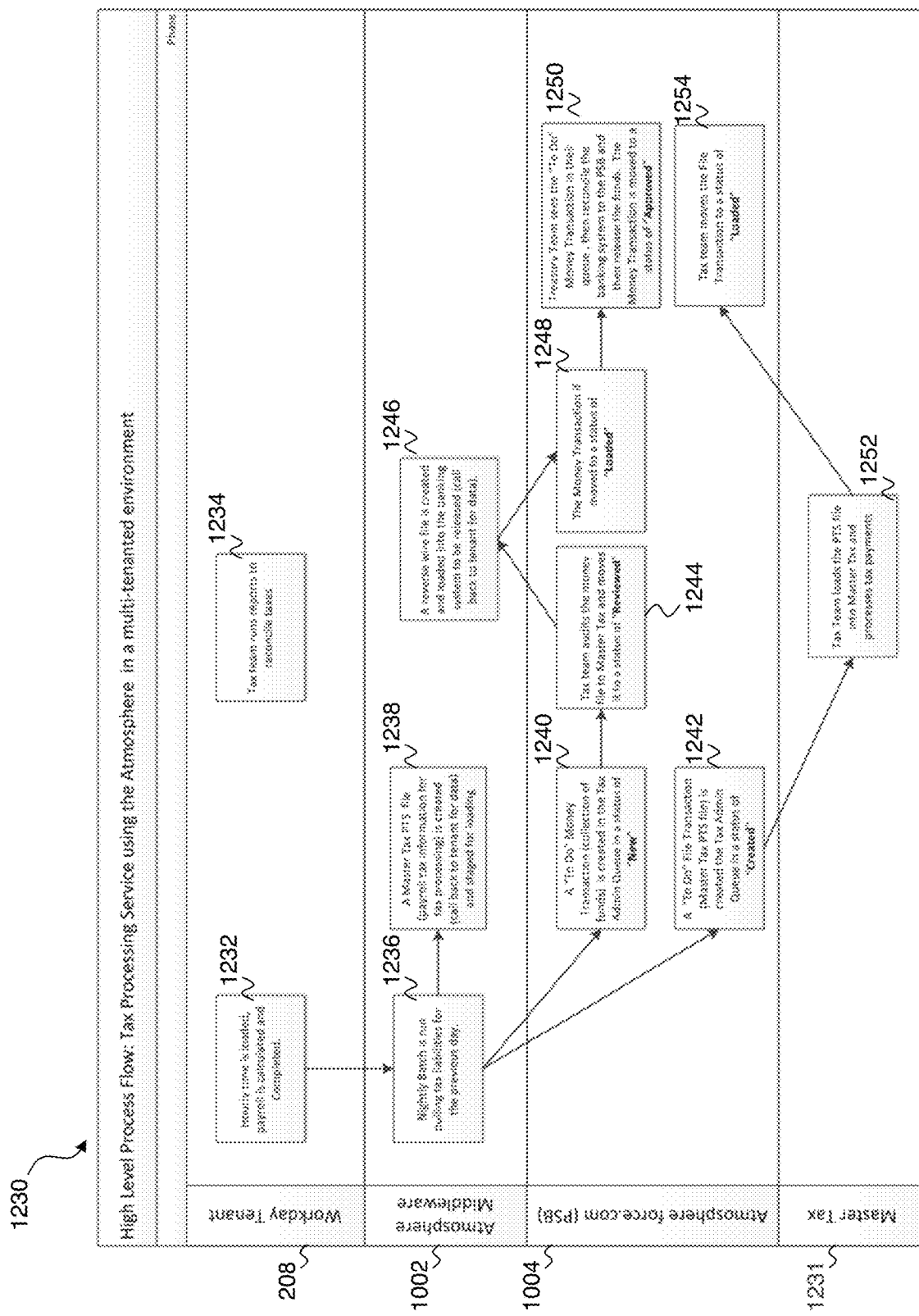
FIG. 12B illustrates one embodiment of a work flow similar or identical to that of FIG. 12A from a system perspective.

Referring to FIG. 12B, a diagram 1230 illustrates one embodiment of a tax processing service work flow that may be used within the environment 200 of FIG. 2. The diagram 1230 illustrates the work flow from a system perspective, rather than the more personnel oriented perspective of FIG. 12A. In the present embodiment, the environment 200 is configured as shown in FIG. 10A, although it is understood that the platform 1002 and 1004 may be combined or otherwise configured differently in other embodiments. For purposes of example, the tenant instance 208 includes Workday as the application 508 (FIG. 5).

In step 1232, hourly time is loaded and payroll is calculated and completed in the tenant instance 208. In step 1234, which also occurs in the tenant instance 208, a tax team may run reports to reconcile taxes. In step 1236, the platform 1002 runs a nightly batch that pulls tax liabilities for the previous day. This step results in step 1238 on the platform 1002, and steps 1240 and 1242 on the platform 1004.

In step 1238, a Master Tax PTS file (e.g., payroll tax information for tax processing) is created and staged for loading. This step may call back into the tenant instance 208 for data.

In step 1240, a "To Do" money transaction (e.g., representing a collection of funds) is created in the tax administrator's queue with a status of "new." In step 1244, the tax team audits the money file to Master Tax and changes the money transaction's status to "reviewed." In step 1246, the platform 1002 creates a reverse wire file and loads it into the banking system to be released. This step may call back into the tenant instance 208 for data. In step 1248, the money transaction's status is changed to "loaded" on the platform 1004. In step 1250, the treasury team sees the "To Do" money transaction in their queue. The treasury team reconciles the banking system to the PSB and then releases the funds. The money transaction's status is changed to "approved."

In step 1242, a "To Do" file transaction (the Master Tax PTS file) is created in the tax administrator's queue with a status of "created." In step 1252, the tax team loads the PTS file into Master Tax (illustrated as component 1231) and processes the tax payments. In step 1254, the tax team changes the money transaction's status to "loaded."

Referring to FIG. 12C, table 1270 illustrates an embodiment of a model that may be used to apportion payroll tax service responsibilities between the outsourcing provider 202 and a client, such as the client 104, within the environment 200 of FIG. 2. It is understood that the platform 204 enables responsibilities to be apportioned in many different ways other than those illustrated in table 1270, with some clients having more involvement than others depending on the particular model that is used. The payroll tax processing work flow remains the same regardless of which model is used, allowing the apportionment to occur without requiring changes to the work flow.

In the present example, the payroll tax service model of table 1270 includes the outsourcing provider 202 assigning one or more tax representatives to handle the provider's responsibilities. After the tax processing has been completed, the funds are transferred from the client's bank into the provider's virtual trust treasury account so the tax payments can be disbursed. Table 1270 includes a column 1272 listing various services and related tasks that are to be performed for that service. Columns 1274 and 1276 represent the outsourcing provider 202 and client 104, respectively. An "X" in one of columns 1274 and 1276 denotes whether the outsourcing provider 202 or client 104 is responsible for that task. As seen in selected entries (e.g., the first three rows) in column 1278, a responsibility may be either the provider's or the client's depending on whether the client 104 has selected the payroll administration services model of table 1180 (FIG. 11D).

Figure 13A:
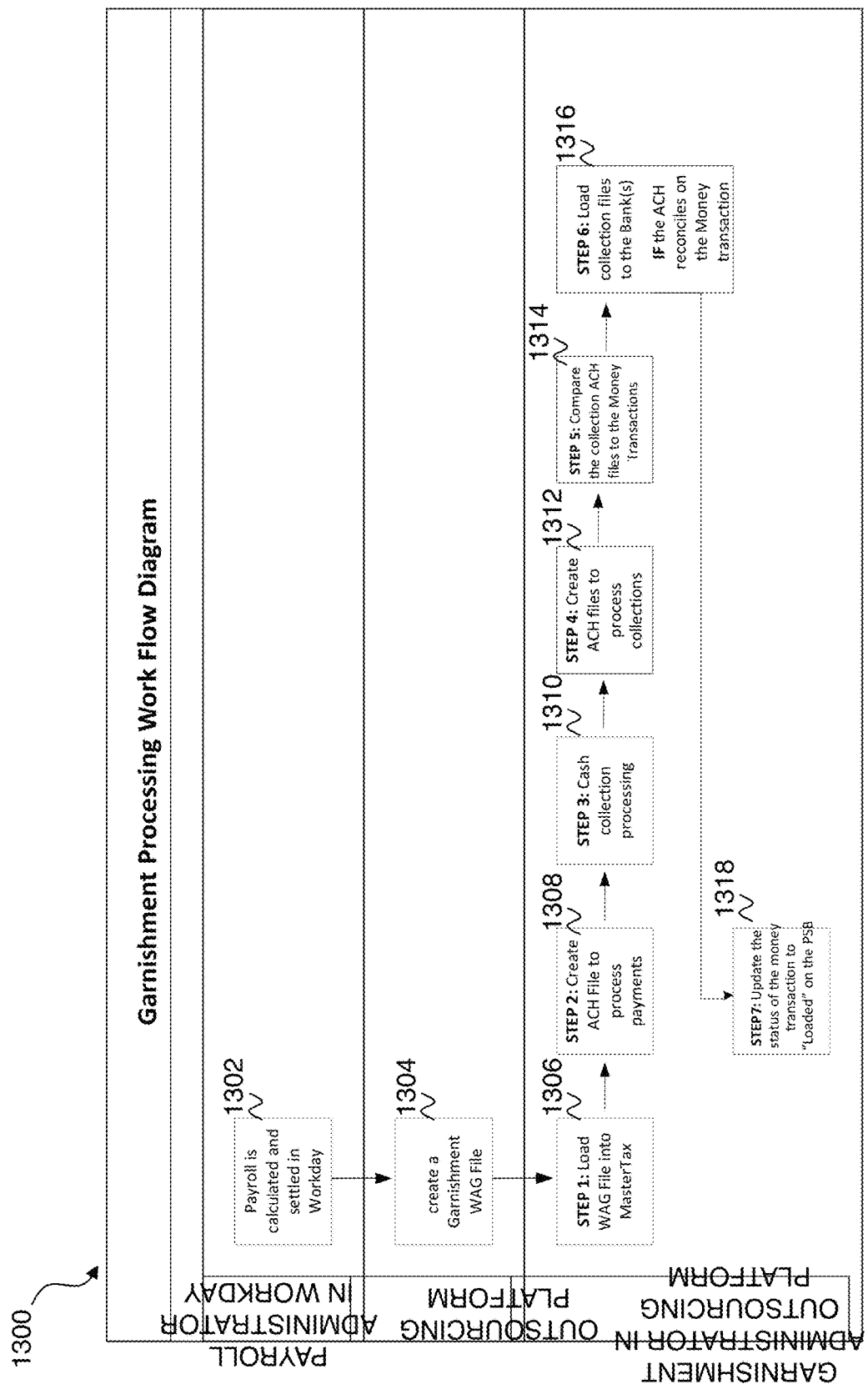
FIG. 13A illustrates one embodiment of a garnishment processing work flow that may occur within the environment of FIG. 2.

Referring to FIG. 13A, a diagram 1300 illustrates one embodiment of a garnishment processing work flow that may be used within the environment 200 of FIG. 2. For purposes of example, the tenant instance 208 includes Workday as the application 508 (FIG. 5). One or more payroll administrators, garnishment administrators, and/or other authorized individuals handles certain actions that are performed within the tenant instance 208 and other actions that are performed within the platform 204. Still other actions may be handled by the platform 204 (e.g., by the process scheduler 506 of FIG. 8) either automatically or after being initiated by a user. The payroll and garnishment administrators may be from either the client 104 or the outsourcing provider 202 (e.g., the representatives 214 and 216) depending on the particular embodiment. It is understood that applications other than Workday may be used, and that the present example is not limited to Workday.

In step 1302, payroll is calculated and settled in Workday within the tenant instance 208 by a payroll administrator from either the client 104 or the provider 212. For example, step 1302 may be performed by either the client 104 or the representative 214. In step 1304, the platform 204 creates a garnishment WAG file.

In step 1306, a multi-step process begins with the garnishment administrator (e.g., the representative 214 or 216) loading the WAG file into a tax program. The present embodiment uses a program such as Master Tax for purposes of example, but it is understood that any tax program having the needed functionality may be used. In step 1308, the garnishment administrator creates an ACH file to process payments. In step 1310, the garnishment administrator handles cash collection processing. In step 1312, the garnishment administrator creates ACH files to process collections. In step 1314, the garnishment administrator compares the collection ACH files to the money transactions. In step 1316, the garnishment administrator sends the collection files to one or more banks if the ACH reconciles to the money transaction. In step 1318, the garnishment administrator updates the status of the money transactions to "Loaded" on the PSB.

Figure 13B:
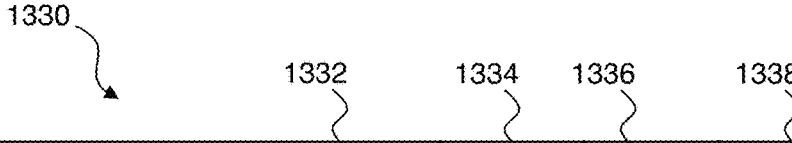
FIG. 13B illustrates one embodiment of a model that may be used to apportion garnishment service responsibilities within the environment of FIG. 2.

Referring to FIG. 13B, table 1330 illustrates an embodiment of a model that may be used to apportion garnishment responsibilities between the outsourcing provider 202 and a client, such as the client 104, within the environment 200 of FIG. 2. It is understood that the platform 204 enables responsibilities to be apportioned in many different ways other than those illustrated in table 1330, with some clients having more involvement than others depending on the particular model that is used. The garnishment processing work flow remains the same regardless of which model is used, allowing the apportionment to occur without requiring changes to the work flow.

In the present example, the garnishment model of table 1330 includes the outsourcing provider 202 assigning incoming orders to a virtual garnishment department that ensures all garnishment payments are processed correctly and sent to the appropriate recipient. After the garnishments processing has been completed, the funds are transferred from the client's bank into the provider's virtual trust treasury account so the garnishment payments can be disbursed. Table 1330 includes a column 1332 listing various services and related tasks that are to be performed for that service. Columns 1334 and 1336 represent the outsourcing provider 202 and client 104, respectively. An "X" in one of columns 1334 and 1336 denotes whether the outsourcing provider 202 or client 104 is responsible for that task. A column 1338 may contain notes for handling various issues related to a specific task.

Figure 14:
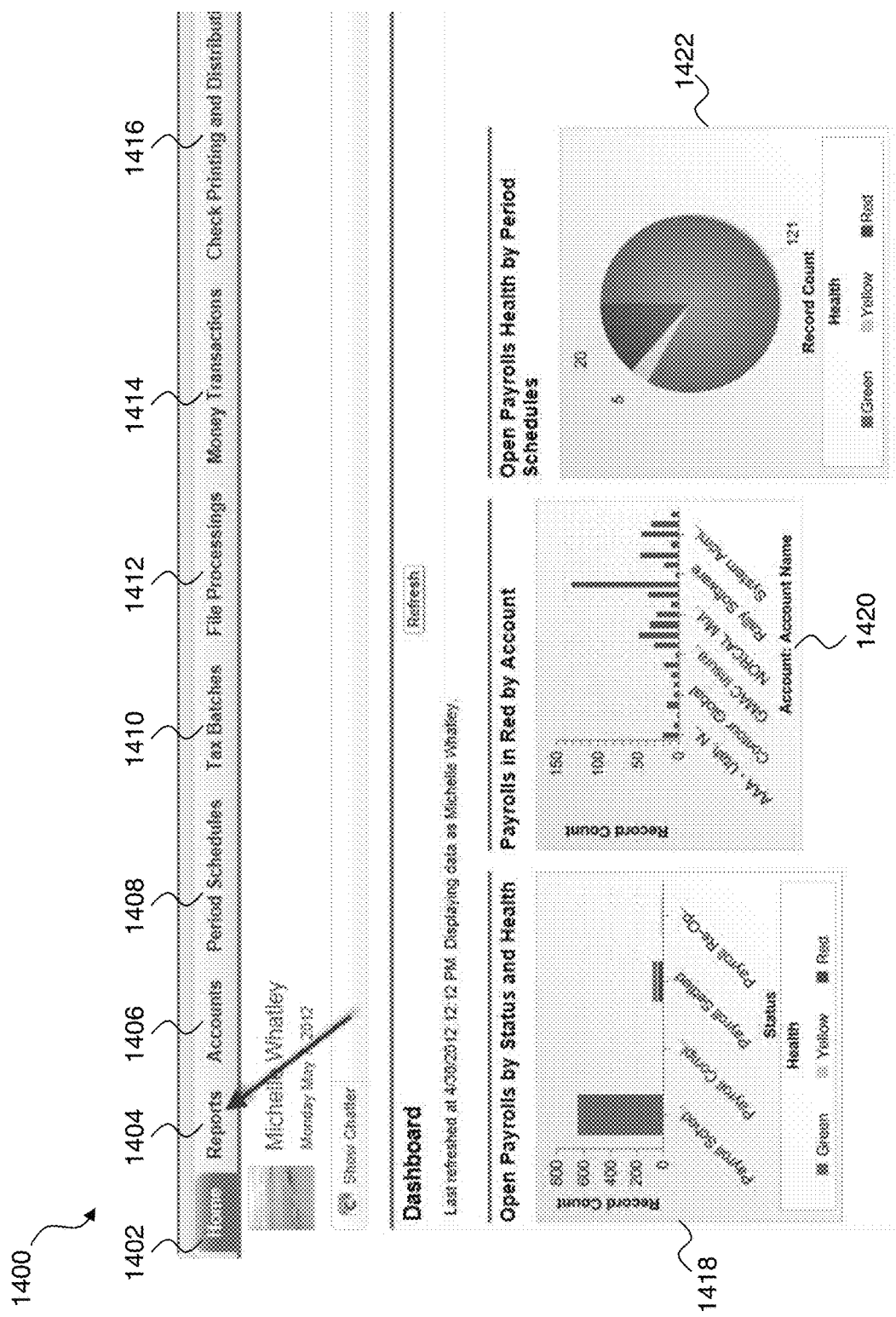

Referring to FIG. 14, one embodiment of a screen display 1400 is illustrated that may be displayed to users of the platform 204 of FIG. 2, such as the representatives 214 and 216. The screen display 1400 may appear after a user logs into the platform 204. In the present example, the screen display 1400 includes various selectable components (e.g., menu items), including Home 1402, Reports 1404, Accounts 1406, Period Schedules 1408, Tax Batches 1410, File Processings 1412, Money Transactions 1414, and Check Printing and Distribution 1416. These menu items may be selected to go to a corresponding area of functionality provided by the platform 204.

The screen display 1400 also includes a dashboard that may be used to provide an overview of various client or system data. In the present example, the dashboard provides a chart 1418 for open payrolls by status and health across all clients, a chart 1420 showing payrolls in red by account, and a chart 1422 showing open payrolls health by period schedules. In the present example, green, yellow, and red are used to provide a visual status indicator of the "health" of some or all of the information displayed by the dashboard. For example, green may indicate a healthy status (e.g., no action is needed or no items are late), yellow may indicate a caution health status (e.g., a deadline is close), and red may indicate an unhealthy status (e.g., something has not cleared or been done and action may be needed). It is understood that the dashboard may be configured to show many types of information and that the information may be displayed in many different ways.

Figure 15:
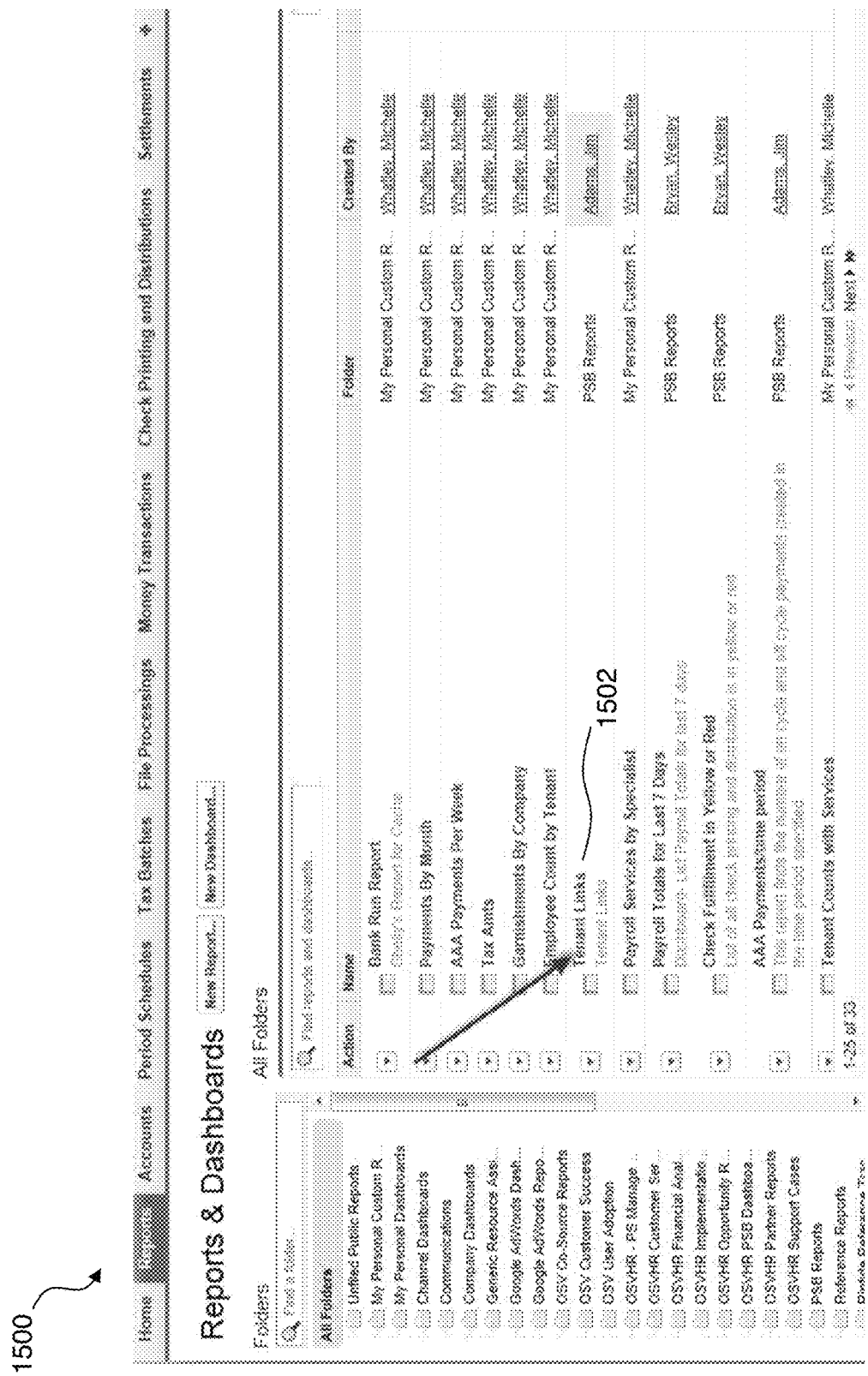

Referring to FIG. 15, one embodiment of a screen display 1500 is illustrated that may be displayed to a user who selects the Reports menu item 1404. The screen display 1500 provides selectable items as a list or other graphical representation of available report types, including a selectable item for Tenant Links 1502.

Figure 16:
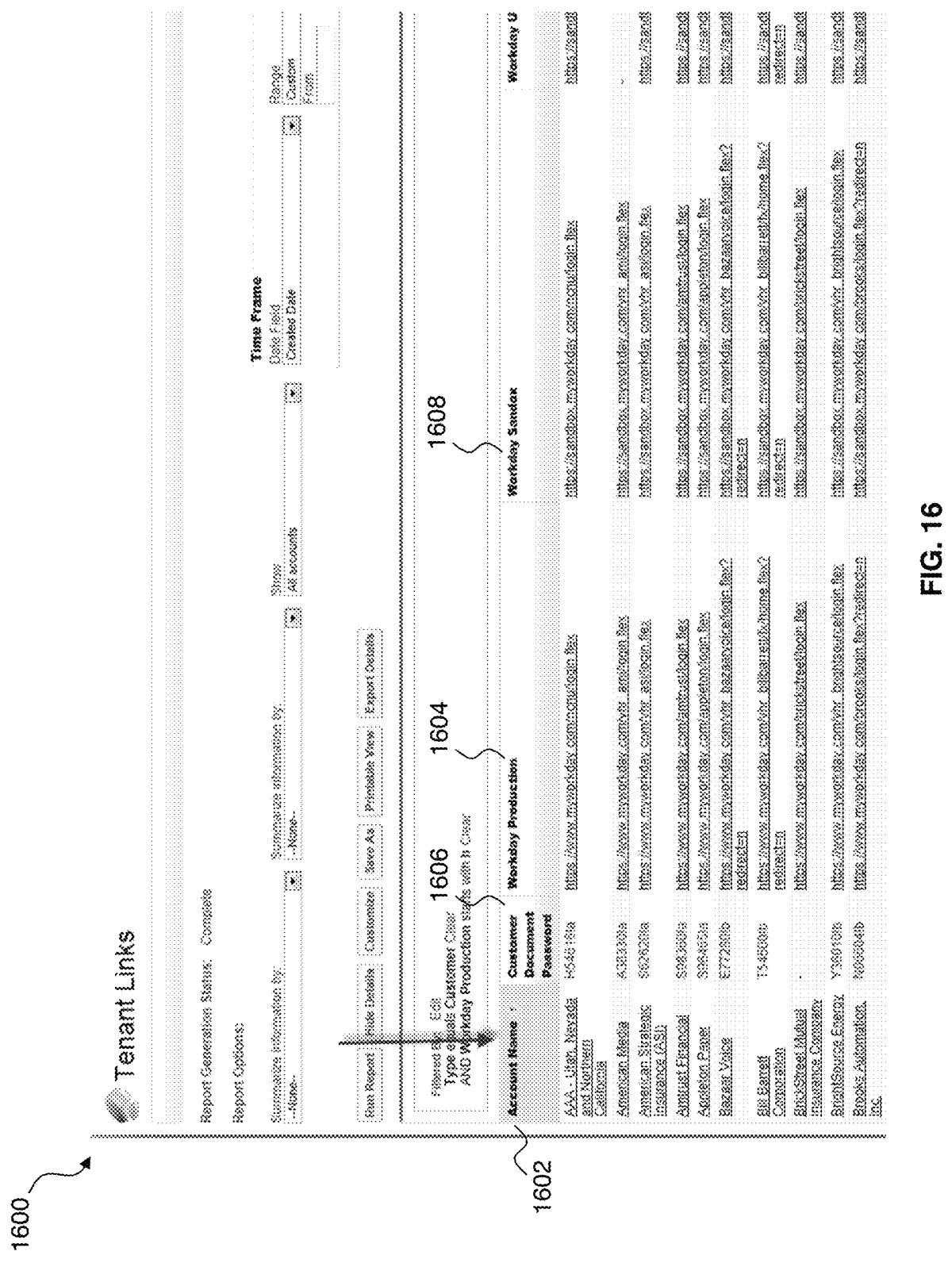

Referring to FIG. 16, one embodiment of a screen display 1600 is illustrated that may be displayed to a user who selects the Tenant Links item 1502. The screen display 1600 provides selectable items as a list or other graphical representation of available client accounts 1602 and a link 1604 to the corresponding tenant instances. For example, the client 104 may be listed along with a link to the corresponding tenant instance 208. Selecting the link 1604 takes the user to the tenant instance 208. Other information may also be available on the display screen 1600, such as a client password for documents 1606 and a link to a sandbox 1608 for the corresponding client.

Figure 17:
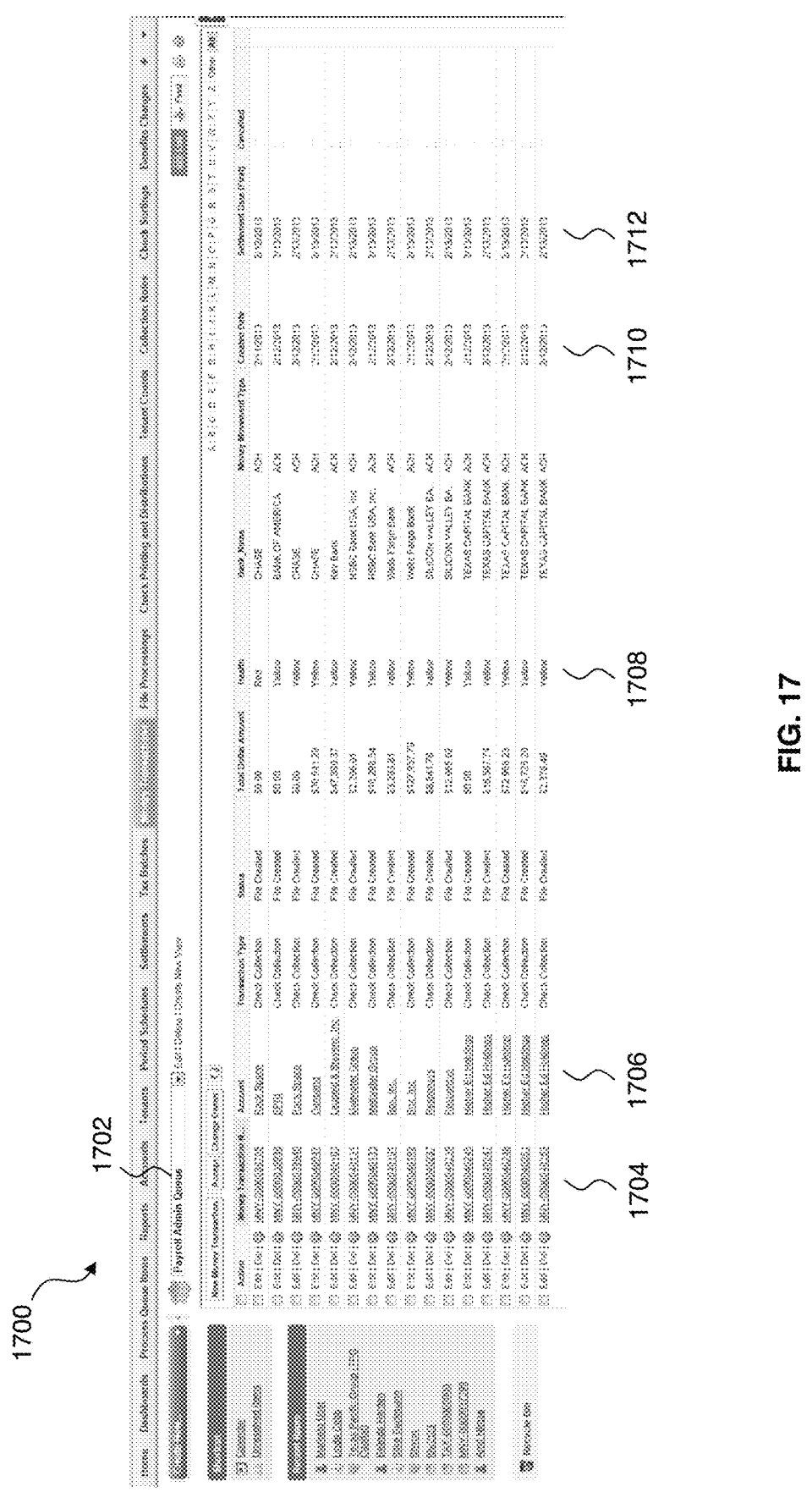

Referring to FIG. 17, one embodiment of a screen display 1700 is illustrated that may be displayed to a user of the platform 204 as the PSB. The screen display 1700 illustrates a queue 1702 (e.g., the Payroll Administrator Queue) of money transactions 1704 for all clients 1706 sorted by health 1708. As can be seen by comparing created dates 1710 with settlement dates 1712, the created and settlement dates for the first client (with a red health status) are earlier than the created and settlement dates for the remaining clients (with a health status of yellow). Accordingly, simply by viewing the screen display 1700, a user can see what items need to be addressed across all clients. This enables the outsourcing provider 202 to identify problem areas that may need attention. For example, more representatives may be needed, more system resources may be needed for the platform 204, and/or work flow issues may need to be modified to handle unanticipated issues. Accordingly, the platform 204 provides the ability for the outsourcing provider 202 to proactively identify and handle issues both on a per client basis and a system wide basis.

As described by various embodiments of the present disclosure, the platform 204 may provide various advantages for the outsourcing provider 202 in areas such as the efficient management of tasks, automated billing, the delivery of invoices and funding information via a real-time customer portal, cloud source business processes, and a relatively flexible technology architecture. It is understood that the following examples are not intended to be limiting and a particular implementation of the platform 204 may have some, all, or none of the following advantages, and may provide other advantages not listed below.

The efficient management of tasks includes task tracking based on tenant events to ensure that tight controls are in place to make sure all processing gets competed on time and correctly. This removes some of the task tracking burden from the service administrators. Health and status fields may be provided for tasks and used to identify issues in services operations so that management can take action to resolve the issues. Dashboards and reports may be used to graphically display transactions and flag any problems.

Automated billing provides the ability to access employee and payment counts in a tenant instance and subsequently automatically create invoices for billing. The delivery of invoices and funding information via the real-time customer portal allows customers to view their information, including invoices and funding information, from within the platform 204.

The cloud source business processes may handle taxes, garnishments, benefits administration, banking, payroll, and other processes. With respect to taxes, the platform 204 may consolidate tax information from the payroll tenants and feed that data into one system for central processing. Collections are automatically processed and sent to the bank. The platform 204 may create data to show the relationships between taxes, collections, and payroll payments. With respect to garnishments, the platform 204 consolidates garnishment information from the payroll tenants and feeds that data into one system for central processing. Collections are automatically processed and sent to the bank. With respect to benefits administration, the platform 204 automatically tracks life events that occur in the HCM system and uses those events to ensure that benefit administration tasks are completed in a timely manner. Life events that are not processed according to the health rules are flagged for escalation using a traffic light indicator (e.g., green, yellow, red health indicators). With respect to banking, all banking files are created and controlled through a workflow that uses the platform 204, which creates a standard review and approval process across all tenants for money movement.

With respect to payroll, payroll schedules, funding, and check printing may be handled. Payroll schedules are pulled into the platform 204 from the tenant instances to create an internal processing calendar. This ensures the outsourcing provider 202 is proactive with clients so no payrolls are missed. For funding, the platform 204 allows the outsourcing provider 202 to configure flexible funding rules around payroll, tax, and garnishment collection. Additionally, the platform 204 creates the files to move monies to fund the various services. For check printing, the platform 204 allows for untenanted check printing. Printing checks in multiple tenants off one account requires coordination on check numbers and the platform 204 provides that coordination. Additionally, when checks are printed in a tenant instance, the platform 204 automatically creates the check printing files and loads them into the printer queue.

With respect to the technology architecture, the platform 204 provides an event based technology that is standard and flexible. The platform 204 can easily be configured to capture and process additional events with minimal changes to the platform's infrastructure. For example, the platform 204 can be configured to go from capturing settlement events to capturing life events from benefits administration with minimal changes. The footprint of what needs to be configured in a tenant instance is small. For example, in the notifier/notification listener framework, a simple integration system that subscribes to specific events is implemented as previously described.

The platform 204 gets data out of a tenant instance via the corresponding public API. The API's are backward compatible and so will remain stable as the application changes when the application provider rolls out major releases. All integration extracts (e.g., data pulls) are created by calling back directly to the tenant instance (e.g., Workday). The platform 204 does not create extracts using data stored in the PSB or elsewhere on the platform 204. All integrations can be monitored from a central location, which enables any errors or problems to be quickly identified and resolved proactively. There are a minimal number of code lines (e.g., just a single code line) for all service integrations. This allows the outsourcing provider 202 to change service integrations quickly and more easily keep pace with the changes that the application provider continues to rollout. Maintaining service integrations in each tenant instance would quickly become a scalability issue if not for this minimal approach.

It will be appreciated by those skilled in the art having the benefit of this disclosure that the systems and methods for service provision in a multi-tenant environment disclosed herein provide advantages in the management of mobile resources. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A method, comprising:
linking platform running on a first computer system with one or more tenant instances running on a second computer system, the one or more tenant instances configured to perform a first one or more defined services subscribed to by clients associated with the one or more tenant instances, wherein the platform is configured to provide a second one or more defined services subscribed to by the clients associated with the one or more tenant instances, and wherein the second one or more defined services are provided by the platform to the one or more tenant instances;
determining, by the platform, whether involvement of the second one or more defined services is triggered, wherein the determining the involvement includes receiving a first event notification from one or more tenant instances after an occurrence of a first event related to the first one or more defined services within one of the one or more tenant;
determining, by the platform, whether first data corresponding to the first event is needed, requesting, by the platform, the first data from the one of the one or more tenant instances;
receiving, by the platform, the first data from the one of the one or more tenant instances;
processing, by the platform, the first event using the first data and the second one or more defined services to obtain a first result; and
performing, by the platform, one or more actions based on the first result.

2. The method of claim 1 further comprising:
aggregating, by the one of the one or more tenant instances, raw data received by the clients associated with the one of the one or more tenant instances to generate aggregated data, wherein the first data includes the aggregated data.

3. The method of claim 1, wherein the first data is stored in a memory corresponding to the one of the one or more tenant instances after being received.

4. The method of claim 1, wherein the requesting the first data comprises transmitting a request to a first application programming interface (API) corresponding to the one of the one or more tenant instances.

5. The method of claim 4 wherein determining whether the first event has occurred within the one of the one or more tenant instances includes querying, by a notification retriever of the platform, the first API.

6. The method of claim 4 wherein determining whether the first event has occurred within the one of the one or more tenant instances includes receiving, by a notification listener of the platform, a first notification that the first event has occurred within the one of the one or more tenant instances.

7. The method of claim 6 wherein the notification listener receives the first notification from a first notifier located on the second computer system.

8. The method of claim 6 further comprising:
queuing, by the notification listener, the first event in a process queue of the platform; and
retrieving, by a process scheduler of the platform, the first event from the process queue.

9. The method of claim 4 wherein the steps of determining that data is needed to process the first event, requesting the data from the first API, and receiving the data from the one of the one or more tenant instances are repeated during the processing of the first event.

10. The method of claim 1, wherein the platform including the first one or more defined services is provided to the clients associated with the one or more tenant instances as a service (SAAS).

11. The method of claim 10 wherein the platform accesses the one of the one or more tenant instances using authorization credentials of the clients associated with the one of the one or more tenant instances accepted by the second computer system.

12. The method of claim 1 wherein the one of the one or more tenant instances is defined identically on the platform and the second computer system.

13. The method of claim 1 wherein a first application functionality including the first one or more defined services corresponds to a financial application provided by the second computer system.

14. The method of claim 13 wherein the first event corresponds to a payroll process.

15. The method of claim 13 wherein the first event corresponds to a garnishment process.

16. The method of claim 13 wherein the first event corresponds to a tax process.

17. The method of claim 1 wherein performing the one or more actions returns information to the one of the one or more tenant instances.

18. The method of claim 1 wherein performing the one or more actions returns no information to the one of the one or more tenant instances.

19. The method of claim 1 further comprising providing, by the platform, a visual indicator of a current status of the first event, wherein the current status indicates a position of the first event in a work flow.

20. The method of claim 19 wherein providing the visual indicator includes updating a payroll status board that provides a visual display of events currently being processed by the platform.

21. The method of claim 1 wherein the second computer system is a server cloud.

22. A method, comprising:
   determining, by a platform configured to perform a first one or more defined services and running on a first computer system, that an event has occurred within a tenant instance on a second computer system, the tenant instance configured to perform a second one or more defined services, wherein a client associated with the tenant instance has subscribed to the second one or more defined services provided by the tenant instance and to the first one or more defined services provided by the platform, and wherein the first one or more defined services are provided by the platform to the tenant instance, and wherein the platform is configured to receive, based on the occurrence of the event within the tenant instance, an event notification from the tenant instance which triggers involvement of at least one of the first one or more defined services of the platform;
   identifying, by the platform, a type of the event and an identification of the tenant instance;
   processing, by the platform, the event, wherein the processing includes:
      determining that data corresponding to the event is needed from the tenant instance;
      requesting the data;
      receiving the data from the tenant instance;
   executing a plurality of actions within the platform based on the data;
   producing a result based on the executed plurality of actions; and
   displaying a graphical representation of the result.

23. The method of claim 22, further comprising providing authorization credentials needed to access the tenant instance to the platform.

24. The method of claim 22, wherein requesting the data comprises transmitting a request to an application programming interface (API) corresponding to the tenant instance.

25. The method of claim 24 wherein determining that the event has occurred within the tenant instance includes querying, by a notification retriever of the platform, the API.

26. The method of claim 22, wherein the data is aggregate data based on calculations performed by the tenant instance.

27. The method of claim 22, wherein the result produced is not producible by the second one or more defined services provided by the tenant instance.

28. The method of claim 22 wherein determining that the event has occurred within the tenant instance includes receiving, by a notification listener of the platform, a notification from a notifier located on the second computer system.

29. The method of claim 22 wherein the steps of determining that data is needed, requesting the data, and receiving the data from the tenant instance are repeated during the processing of the event.

30. The method of claim 22 wherein the second one or more defined services corresponds to a financial application provided by the second computer system.

31. The method of claim 30 wherein the event corresponds to a payroll process.

32. The method of claim 30 wherein the event corresponds to a tax process.

33. The method of claim 22 wherein at least one of the actions includes communicating, by the platform, with a third computer system to access the second one or more defined services provided by the third computer system, wherein the second one or more defined services is needed by the platform to perform the processing.

34. The method of claim 33 wherein the second one or more defined services is provided via the third computer system by a software as a service (SAAS) application provider.

35. A system, comprising:
   an outsourcing service augmentation platform having instructions of one or more applications stored in a memory and configured to operate on a processor of a first computer system, the outsourcing service augmentation platform configured to interact with a tenant instance and provide a first one or more defined services subscribed to by a client, wherein the tenant instance is configured to provide a second one or more defined services subscribed to by the client, and wherein the first one or more defined services are provided by the outsourcing service augmentation platform to the tenant instance, and wherein the outsourcing service augmentation platform is configured to receive, based on an occurrence of the event within the tenant instance, an event notification from the tenant instance which triggers involvement of at least one of the first one or more defined services of the outsourcing service augmentation platform, and wherein the one or more applications include:
   a notification listener configured to receive the event notification based on the second one or more defined services from a notifier located in the tenant instance;
   a notification retriever configured to retrieve the event notification from the tenant instance without interacting with the notifier;
   a process queue configured to enqueue the event notification; and
   a process scheduler configured to dequeue the event notification from the process queue and process the event notification based on an event type, the process scheduler including a process scheduler manager, an event processor, a business logic layer having a plurality of modules configured to process a plurality of event types.

36. The system of claim 35, wherein the one or more applications include a payroll status board configured to receive updates from the event processor and to provide a visual representation of the updates for viewing on a display.

37. The system of claim 35, wherein the process queue and the process scheduler are located in a distributed computing environment, and the process scheduler also containing an integration layer configured to communicate with the tenant instance.

38. The system of claim 35 wherein the outsourcing service augmentation platform provides outsourcing services to a client controlling the tenant instance.

* * * * *

UNITED STATES PATENT AND TRADEMARK OFFICE
CERTIFICATE OF CORRECTION

PATENT NO. : 10,853,151 B2  
APPLICATION NO. : 15/974580  
DATED : December 1, 2020  
INVENTOR(S) : Wesley Bryan et al.

Page 1 of 1

It is certified that error appears in the above-identified patent and that said Letters Patent is hereby corrected as shown below:

In the Claims

At Column 25, Claim number 1, Line number 41, delete "linking platform" and replace with --linking a platform--.
At Column 25, Claim number 1, Line number 58, delete "one or more tenant;" and replace with --one or more tenant instances;--.
At Column 25, Claim number 1, Line number 60, delete "first event is needed, requesting," and replace with --first event is needed to process the second one or more defined services; in response to the determination that the first data is needed, requesting,--.

Signed and Sealed this  
Ninth Day of March, 2021

Drew Hirshfeld  
*Performing the Functions and Duties of the*  
*Under Secretary of Commerce for Intellectual Property and*  
*Director of the United States Patent and Trademark Office*